(12) United States Patent
Je et al.

(10) Patent No.: US 9,954,473 B2
(45) Date of Patent: Apr. 24, 2018

(54) MOTOR DRIVING APPARATUS AND HOME APPLIANCE INCLUDING THE SAME

(71) Applicants: LG ELECTRONICS INC., Seoul (KR); Pusan National University Industry-University Cooperation Foundation, Busan (KR)

(72) Inventors: Jungmoon Je, Seoul (KR); Hansu Jung, Seoul (KR); Chungill Lee, Seoul (KR); Jangmok Kim, Pusan (KR); Hyunkeun Ku, Pusan (KR); Hanbeom Yeom, Ulsan (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/205,638

(22) Filed: Jul. 8, 2016

(65) Prior Publication Data

US 2017/0070172 A1    Mar. 9, 2017

(30) Foreign Application Priority Data

Jul. 10, 2015    (KR) .................... 10-2015-0098556

(51) Int. Cl.
  *H02P 21/24*    (2016.01)
  *H02P 27/08*    (2006.01)
  *H02P 6/18*    (2016.01)

(52) U.S. Cl.
  CPC ............... *H02P 21/24* (2016.02); *H02P 6/18* (2013.01); *H02P 27/08* (2013.01)

(58) Field of Classification Search
  CPC .. H02P 6/182; H02P 6/18; H02P 21/26; H02P 2203/01; H02P 25/03; H02P 6/08;
  (Continued)

(56) References Cited

U.S. PATENT DOCUMENTS

| 5,537,308 A | * | 7/1996 | Gritter | ............. H02M 7/53873 |
| | | | | 363/37 |
| 6,058,036 A | * | 5/2000 | Endo | ................. H02M 7/53875 |
| | | | | 363/98 |

(Continued)

FOREIGN PATENT DOCUMENTS

| JP | 2011004538 A | 1/2011 |
| JP | 2015-023755 A | 2/2015 |

OTHER PUBLICATIONS

You Jae Jun, Ku Hyun Keun, Yeom Han Beom, Kim Jang Mok, "New method of estimating average phase current in accordance with the switching state of the One-shunt inverter", Power Electronics Annual Conference, Jul. 2015, 501-502 (2 page), Jul. 7-9, 2015.

*Primary Examiner* — Rita Leykin
(74) *Attorney, Agent, or Firm* — Dentons US LLP

(57) ABSTRACT

The present invention relates to a motor driving apparatus and a home appliance including the same. A motor driving apparatus according to an embodiment of the present invention includes an inverter for converting a DC voltage of a DC-link capacitor into an AC voltage according to a switching operation and outputting the converted AC voltage to a motor; a DC-link resistor disposed between the DC-link capacitor and the inverter; and a controller for controlling the inverter based on a phase current sampled through the DC-link resistor, wherein the controller estimates a phase current based on the phase current sampled through the DC link resistor, in an interval in which phase current detection is not possible. Thereby, the phase current flowing through the motor may be accurately calculated using the DC link resistor.

15 Claims, 34 Drawing Sheets

(58) Field of Classification Search
CPC .. H02P 6/16; H02P 6/185; H02P 6/186; H02P 6/22; H02P 6/24; H02P 21/24; H02P 27/08; G01R 19/0092; G01R 1/203; H02M 2001/0009; H02M 7/53875; H02M 7/05; H02M 7/53
USPC ......... 318/400.32, 801, 800, 400.02; 363/37, 363/34
See application file for complete search history.

(56) References Cited

U.S. PATENT DOCUMENTS

| | | | | |
|---|---|---|---|---|
| 7,084,601 | B2* | 8/2006 | Maeda | G01R 1/203 318/803 |
| 7,102,327 | B2* | 9/2006 | Ho | H02P 8/12 318/599 |
| 7,671,557 | B2* | 3/2010 | Maeda | H02M 7/53873 318/729 |
| 8,040,086 | B2* | 10/2011 | Yamamoto | H02P 21/24 318/400.02 |
| 8,471,519 | B2* | 6/2013 | Ito | B60L 11/14 318/727 |
| 8,520,419 | B2* | 8/2013 | Sakakibara | H02P 27/08 363/89 |
| 9,093,915 | B2* | 7/2015 | Hashimoto | H02M 5/42 |
| 9,537,427 | B2* | 1/2017 | Jiang | H02M 7/5395 |
| 9,595,904 | B2* | 3/2017 | Lee | H02M 7/53871 |
| 9,705,438 | B2* | 7/2017 | Zhao | H02P 6/182 |
| 9,708,744 | B2* | 7/2017 | Jung | D06F 37/304 |
| 2003/0090241 | A1* | 5/2003 | Nakatsu | H01C 1/14 322/27 |
| 2004/0062062 | A1* | 4/2004 | Lee | H02M 7/797 363/37 |
| 2004/0095090 | A1* | 5/2004 | Nukushina | H02P 6/28 318/800 |
| 2004/0183498 | A1* | 9/2004 | Iwaji | H02P 21/00 318/801 |
| 2015/0128660 | A1* | 5/2015 | Jung | D06F 37/304 68/3 R |
| 2017/0019043 | A1* | 1/2017 | Zhao | H02P 6/182 |

\* cited by examiner

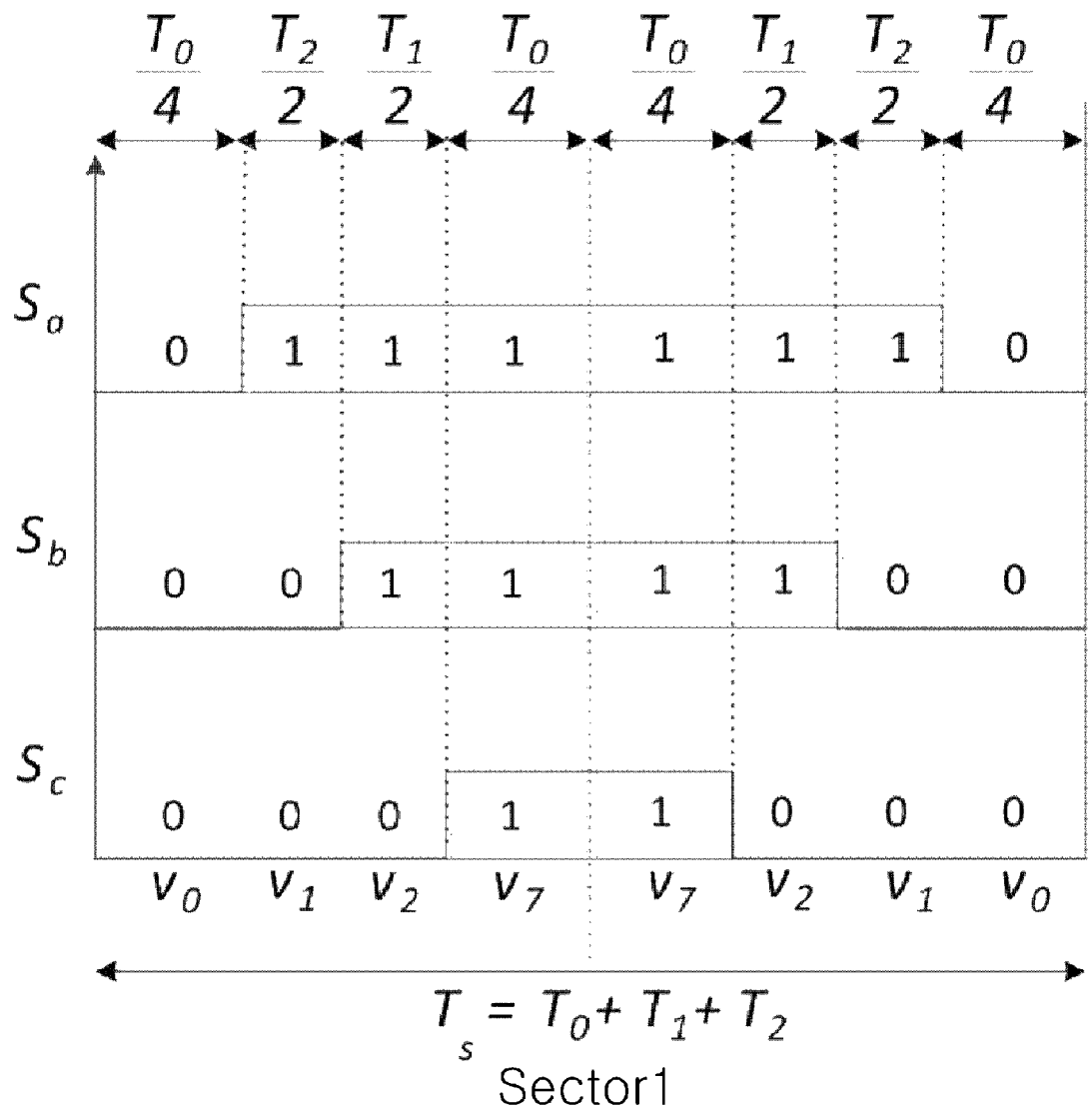

Sector3

Sector6

FIG. 8

| Effective Voltage Vector | $V_1$ (100) | $V_2$ (110) | $V_3$ (010) | $V_4$ (011) | $V_5$ (001) | $V_6$ (101) | $V_0, V_7$ (000), (111) |
|---|---|---|---|---|---|---|---|
| DC-Link Current | $I_{as}$ | $-I_{cs}$ | $I_{bs}$ | $-I_{as}$ | $I_{cs}$ | $-I_{bs}$ | Not available |

FIG. 12A(a)
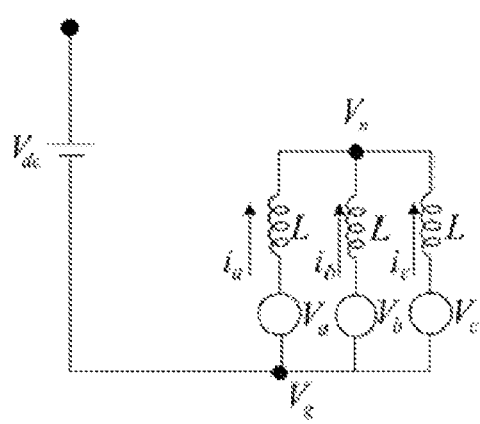
FIG. 12A(b)
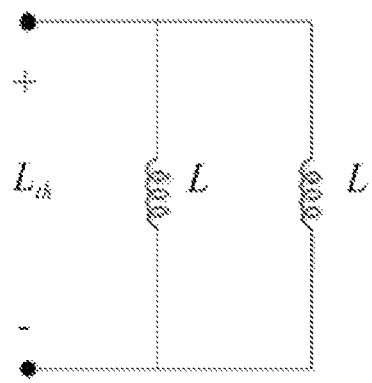
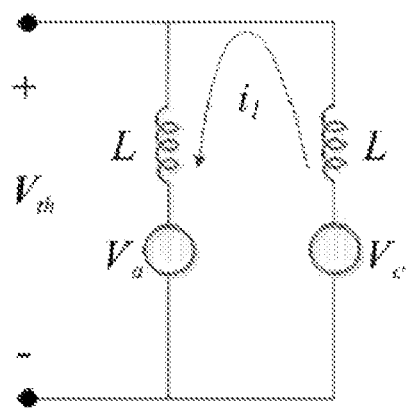
FIG. 12A(c)
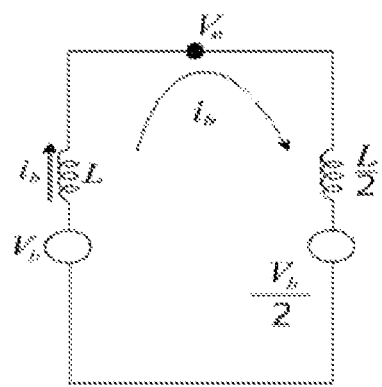
FIG. 12A(d)

FIG. 12B(a)
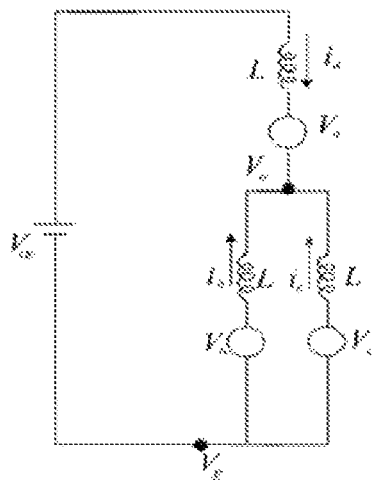
FIG. 12B(b)
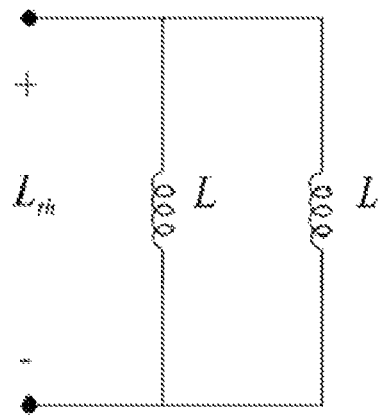
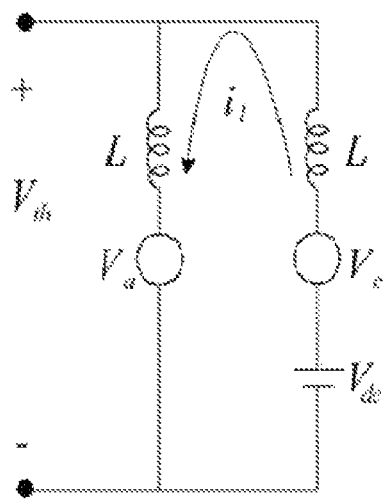
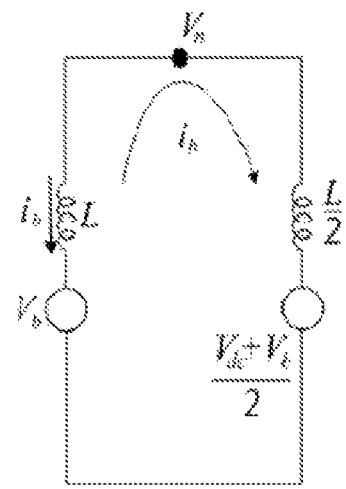
FIG. 12B(c)
FIG. 12B(d)

FIG. 13

| Switching | A-phase current gradient | B-phase current gradient | C-phase current gradient |
|---|---|---|---|
| 000 | $-\dfrac{V_a}{L}$ | $-\dfrac{V_b}{L}$ | $-\dfrac{V_c}{L}$ |
| 001 | $\dfrac{-3V_a - V_{dc}}{3L}$ | $\dfrac{-3V_b - V_{dc}}{3L}$ | $\dfrac{-3V_c + 2V_{dc}}{3L}$ |
| 010 | $\dfrac{-3V_a - V_{dc}}{3L}$ | $\dfrac{-3V_b + 2V_{dc}}{3L}$ | $\dfrac{-3V_c - V_{dc}}{3L}$ |
| 011 | $\dfrac{-3V_a + 2V_{dc}}{3L}$ | $\dfrac{-3V_b + V_{dc}}{3L}$ | $\dfrac{-3V_c + V_{dc}}{3L}$ |
| 100 | $\dfrac{-3V_a + 2V_{dc}}{3L}$ | $\dfrac{-3V_b - V_{dc}}{3L}$ | $\dfrac{-3V_c - V_{dc}}{3L}$ |
| 101 | $\dfrac{-3V_a + V_{dc}}{3L}$ | $\dfrac{-3V_b - 2V_{dc}}{3L}$ | $\dfrac{-3V_c + V_{dc}}{3L}$ |
| 110 | $\dfrac{-3V_a + V_{dc}}{3L}$ | $\dfrac{-3V_b + V_{dc}}{3L}$ | $\dfrac{-3V_c - 2V_{dc}}{3L}$ |
| 111 | $-\dfrac{V_a}{L}$ | $-\dfrac{V_b}{L}$ | $-\dfrac{V_c}{L}$ |

FIG. 14C
| Sector | 1st | 2nd | 3rd |
|---|---|---|---|
| 1 | A phase | B phase | C phase |
| 2 | B phase | A phase | C phase |
| 3 | B phase | C phase | A phase |
| 4 | C phase | B phase | A phase |
| 5 | C phase | A phase | B phase |
| 6 | A phase | C phase | B phase |
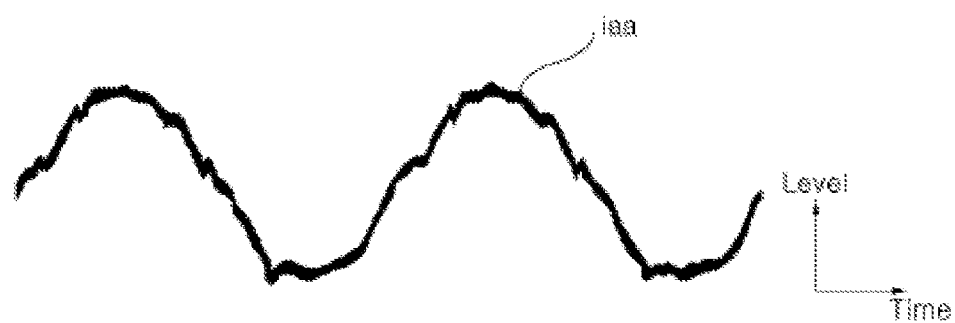
FIG. 15A
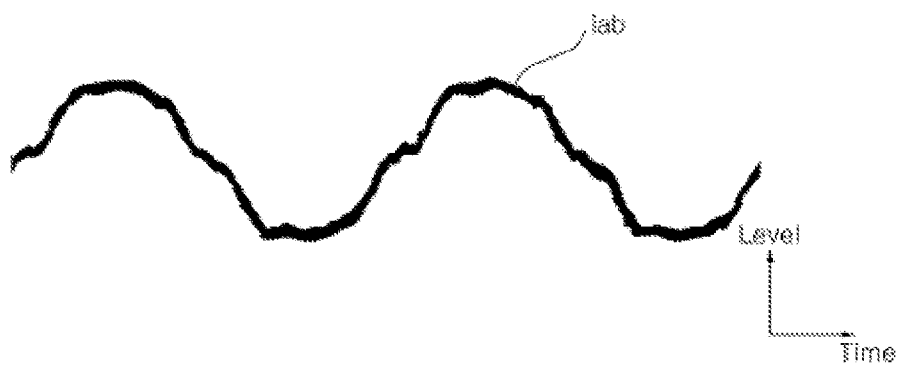
FIG. 15B

MOTOR DRIVING APPARATUS AND HOME APPLIANCE INCLUDING THE SAME

CROSS-REFERENCE TO RELATED APPLICATION

This application claims the priority benefit of Korean Patent Application No. 10-2015-0098556, filed on, 10 Jul. 2015, in the Korean Intellectual Property Office, the disclosure of which is incorporated herein by reference.

BACKGROUND OF THE INVENTION

1. Field of the Invention

The present invention relates to a motor driving apparatus and a home appliance including the same and, more particularly, to a motor driving apparatus capable of accurately calculating a phase current flowing through a motor using a DC link resistor, and a home appliance including the same.

2. Description of the Related Art

A motor driving apparatus is an apparatus configured to drive a motor equipped with a rotor for rotational movement and a stator on which a coil is wound.

Motor driving apparatuses may be divided into a sensor type motor driving apparatus which employs a sensor and a sensorless motor driving apparatus.

Recently, sensorless motor driving apparatuses have been widely used for reasons such as reduction of manufacturing costs. Research has been conducted on sensorless motor driving apparatuses to ensure an efficient motor driving operation.

SUMMARY OF THE INVENTION

Therefore, the present invention has been made in view of the above problems, and it is an object of the present invention to provide a motor driving apparatus capable of accurately calculating a phase current flowing through a motor using a DC link resistor, and a home appliance including the same.

In accordance with an aspect of the present invention, the above and other objects can be accomplished by the provision of a motor driving apparatus including an inverter for converting a DC voltage of a DC-link capacitor into an AC voltage according to a switching operation and outputting the converted AC voltage to a motor, a DC-link resistor disposed between the DC-link capacitor and the inverter, and a controller for controlling the inverter based on a phase current sampled through the DC-link resistor, wherein the controller estimates a phase current based on the phase current sampled through the DC link resistor, in an interval in which phase current detection is not possible.

In accordance with another aspect of the present invention, there is provided a motor driving apparatus including an inverter for converting a DC voltage of a DC-link capacitor into an AC voltage according to a switching operation and outputting the converted AC voltage to a motor, a DC-link resistor disposed between the DC-link capacitor and the inverter, and a controller for controlling the inverter based on a phase current sampled through the DC-link resistor, wherein the controller controls a switching element in the inverter according to space vector-based pulse width modulation control, and estimates a phase current during a pulse width modulation control period, based on the sampled phase current, a phase current gradient according to a switching pattern of a switching element in the inverter, and a voltage vector application time according to a voltage command value.

In accordance with a further aspect of the present invention, there is provided a home appliance including a motor, an inverter for converting a DC voltage of a DC-link capacitor into an AC voltage according to a switching operation and outputting the converted AC voltage to the motor, a DC-link resistor disposed between the DC-link capacitor and the inverter, and a controller for controlling the inverter based on a phase current sampled through the DC-link resistor, wherein the controller estimates a phase current based on the phase current sampled through the DC link resistor, in an interval in which phase current detection is not possible.

In accordance with yet another aspect of the present invention, there is provided a home appliance including a motor, an inverter for converting a DC voltage of a DC-link capacitor into an AC voltage according to a switching operation and outputting the converted AC voltage to the motor, a DC-link resistor disposed between the DC-link capacitor and the inverter, and a controller for controlling the inverter based on a phase current sampled through the DC-link resistor, wherein the controller controls a switching element in the inverter according to space vector-based pulse width modulation control, and estimates a phase current during a pulse width modulation control period, based on the sampled phase current, a phase current gradient according to a switching pattern of a switching element in the inverter, and a voltage vector application time according to a voltage command value.

BRIEF DESCRIPTION OF THE DRAWINGS

The above and other objects, features and other advantages of the present invention will be more clearly understood from the following detailed description taken in conjunction with the accompanying drawings, in which:

FIGS. 7A to 7F are diagrams illustrating switching of respective switching elements in the inverter corresponding to the zero vector and the effective vector of FIG. 6;

FIG. 8 illustrates statuses of motor currents detected through a DC resistor for the respective vectors of FIG. 6;

FIG. 13 illustrates phase currents according to respective switching patterns;

FIG. 14C illustrates an order of duty ratios in each sector;

FIG. 15A illustrates a sensed current and FIG. 15B illustrates an estimated current according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

A motor driving apparatus described in this specification is an apparatus which is not provided with a position sensor such as a Hall sensor for sensing the position of the rotor of a motor, but is capable of estimating the position of the rotor of the motor in a sensorless manner. Hereinafter, a sensorless motor driving apparatus will be described.

A motor driving apparatus 220 according to an embodiment of the present invention may be referred to as a motor drive unit.

Figure 1:
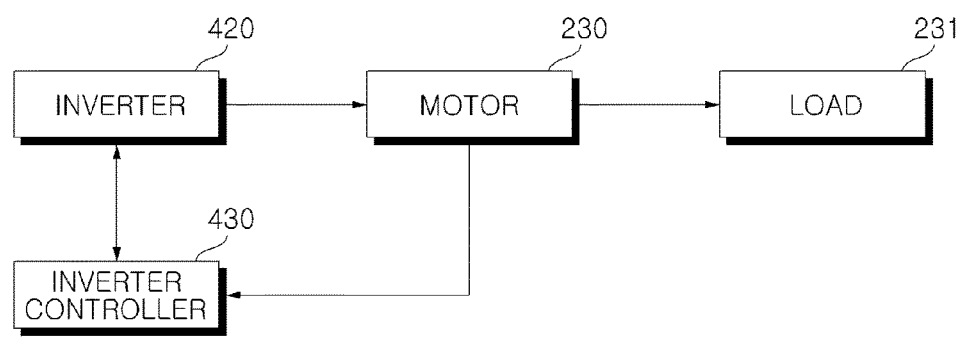
FIG. 1 is an internal block diagram illustrating a motor driving apparatus according to an embodiment of the present invention.
Figure 2:
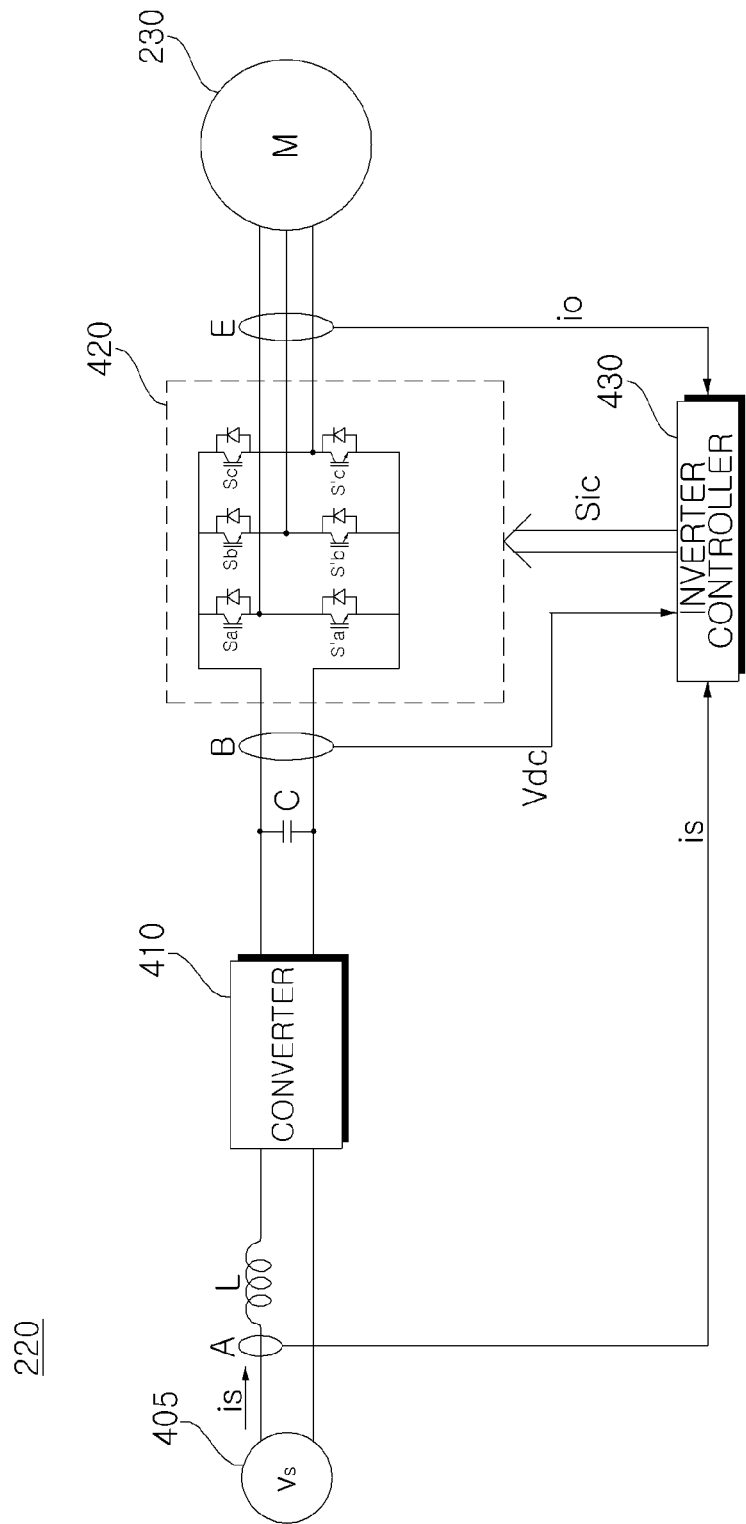
FIG. 2 is an internal circuit diagram illustrating the motor driving apparatus of FIG. 1.

FIG. 1 is an internal block diagram illustrating a motor driving apparatus according to an embodiment of the present invention, and FIG. 2 is an internal circuit diagram illustrating the motor driving apparatus of FIG. 1.

Referring to FIGS. 1 and 2, the motor driving apparatus 220, which is configured to drive a motor in a sensorless manner, may include an inverter 420 and an inverter controller 430.

The motor driving apparatus 220 may also include a converter 410, a DC link voltage detector B, a smoothing capacitor C, and an output current detector E. The drive unit 220 may further include an input current detector A and a reactor L.

The motor driving apparatus 220 detects a phase current using one DC link resistor disposed between the DC link capacitor and the inverter. The inverter controller 430 estimates a phase current based on a phase current sampled through the DC link resistor in an interval in which phase current detection is not possible. Thereby, the motor driving apparatus 220 may accurately calculate the phase current flowing through the motor using the DC link resistor.

As the phase current is detected through time division using one DC link resistor, manufacturing costs may be reduced, and apparatus installation may be facilitated.

The inverter controller 430 controls a switching element in the inverter through space vector-based pulse width modulation control, and estimates a phase current based on the phase current sampled through the DC resistor in an interval in which phase current detection is impossible within the period of pulse width modulation control as the voltage vector application time is shorter than the minimum voltage application time. Thereby, it is not necessary to intentionally shift the switching timing of the inverter switching element. Therefore, noise may not occur and thus the phase current may be accurately calculated.

The inverter controller 430 may estimate, in the interval in which phase current detection is not possible, a phase current based on a phase current sampled through the DC link resistor, a phase current gradient according to a switching pattern of the switching element in the inverter and a voltage vector application time according to a voltage command value.

The inverter controller 430 may estimate an average phase current in estimating the phase current.

The inverter controller 430 may control the switching element in the inverter in the manner of space vector-based pulse width modulation control. The inverter controller 430 may detect 2 phase currents of a 3-phase current flowing through the motor at different times in the interval in which phase current detection is possible during the pulse width modulation control period. The inverter controller 430 may calculate the other phase current based on the two detected phase currents.

The inverter controller 430 may perform current compensation on the 3-phase current, which is detected and calculated at different times, with respect to a first time within the pulse width modulation control period, and control the inverter based on the current-compensated 3-phase current. Thereby, the accuracy of controlling the inverter may be further enhanced.

The inverter controller 430 may estimate a phase current based on a phase current sampled through the DC link resistor in the interval in which phase current detection is not possible, without turn-on timing shift for the switching element of the inverter.

Hereinafter, operations of constituent units in the motor driving apparatus 220 of FIGS. 1 and 2 will be described.

The reactor L is disposed between a commercial AC voltage source 405 ($v_s$) and the converter 410 to perform power factor correction or voltage boost. The reactor L may also function to restrict a harmonic current according to high-speed switching of the converter 410.

The input current detector A may detect input current is that is input from the commercial AC voltage source 405. To this end, a current transformer (CT) or a shunt resistor may be used as the input current detector A. The detected input current is, which is a discrete signal in the form of a pulse, may be input to the inverter controller 430.

The converter 410 converts the commercial AC voltage 405 applied via the reactor L into DC voltage and output the DC voltage. While the commercial AC voltage 405 is illustrated as a single-phase AC voltage, 3-phase AC voltage may be employed as the commercial AC voltage 405. The internal structure of the converter 410 depends on the type of the commercial AC voltage source 405.

The converter 410 may be configured by diodes without the switching element. In this case, the converter 410 may perform the rectification operation without performing a separate switching operation.

For example, when the applied power is single-phase AC voltage, 4 diodes may be used in the form of a bridge. When the applied power is 3-phase AC voltage, 6 diodes may be used in the form of a bridge.

As the converter 410, a half-bridge converter formed by connecting, for example, 2 switching elements and 4 diodes may be used. When 3-phase AC voltage is employed, 6 switching elements and 6 diodes may be used.

When the converter 410 is provided with switching elements, the converter 410 may perform voltage boost, power factor improvement and DC voltage conversion according to the switching operation of the switching elements.

The smoothing capacitor C smoothes and stores input power. While, the figure illustrates that one smoothing capacitor C is used, a plurality of smoothing capacitors may be provided to secure device stability.

While the smoothing capacitor C is illustrated as being connected to the output terminal of the converter 410, embodiments of the present invention are not limited thereto. DC voltage may be directly applied to the smoothing capacitor C. For example, DC voltage from a solar cell may be directly input to the smoothing capacitor C or input to the smoothing capacitor C via DC-DC conversion. Hereinafter, description will be given based on details shown in the figures.

As DC voltage is stored in the smoothing capacitor C, both ends of the smoothing capacitor C may be referred to as DC ends or DC link ends.

The DC link voltage detector B may detect a DC link voltage Vdc between both ends of the smoothing capacitor C. To this end, the DC link voltage detector B may include a resistor and an amplifier. The detected DC link voltage Vdc may be input to the inverter controller 430 as a discrete signal in the form of a pulse.

The inverter 420 may be provided with a plurality of inverter switching elements. Thereby, the inverter 420 may convert the rectified DC voltage Vdc into 3-phase AC voltages va, vb, and vc of predetermined frequencies according to turning on/off of the switching elements and output the converted powers to a 3-phase synchronous motor 230.

The inverter 420 includes upper switching elements Sa, Sb and Sc and lower switching elements S'a, S'b and S'c. Each of the upper switching elements Sa, Sb, Sc and a corresponding lower switching element S'a, S'b, S'c are connected in series to form a pair. Three pairs of upper and lower switching elements Sa and S'a, Sb and S'b, and Sc and S'c are connected in parallel. Each of the switching elements Sa, S'a, Sb, S'b, Sc and S'c is connected with a diode in an antiparallel manner.

Each of the switching elements in the inverter 420 is turned on/off based on an inverter switching control signal Sic from the inverter controller 430. Thereby, 3-phase AC voltage having a predetermined frequency is output to the 3-phase synchronous motor 230.

The inverter controller 430 may control the switching operation of the inverter 420 in a sensorless manner. To this end, the inverter controller 430 may receive an output current $i_o$ detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and output based on the output current $i_o$ detected by the output current detector E. The operation of outputting the inverter switching control signal Sic from the inverter controller 430 will be described in detail with reference to FIG. 3 later in this specification.

The output current detector E detects the output current $i_o$ flowing between the inverter 420 and the 3-phase motor 230. That is, the output current detector E detects current flowing to the motor 230. The output current detector E may detect all output currents ia, ib and ic of the respective phases, or may detect output currents of two phases using 3-phase smoothing.

The output current detector E may be positioned between the inverter 420 and the motor 230, and may employ a current transformer (CT), a shunt resistor, or the like to detect currents.

In using shunt resistors, three shunt resistors may be positioned between the inverter 420 and the synchronous motor 230, or ends of the shunt resistors may be connected to the three lower switching elements S'a, S'b and S'c of the inverter 420. It is also possible to use two shunt resistors based on 3-phase smoothing. When a single shunt resistor is employed, the shunt resistor may be disposed between the capacitor C and the inverter 420.

The detected output current $i_o$ may be a discrete signal in the form of a pulse and applied to the inverter controller 430. The inverter switching control signal Sic is generated based on the detected output current $i_o$. In the following description, the output current $i_o$ may be illustrated as including 3-phase output currents ia, ib and ic.

The 3-phase motor 230 includes a stator and a rotor. The rotor rotates when AC current of a phase of a predetermined frequency is applied to a coil of a corresponding phase (of a, b and c phases) of the stator.

The motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 3:
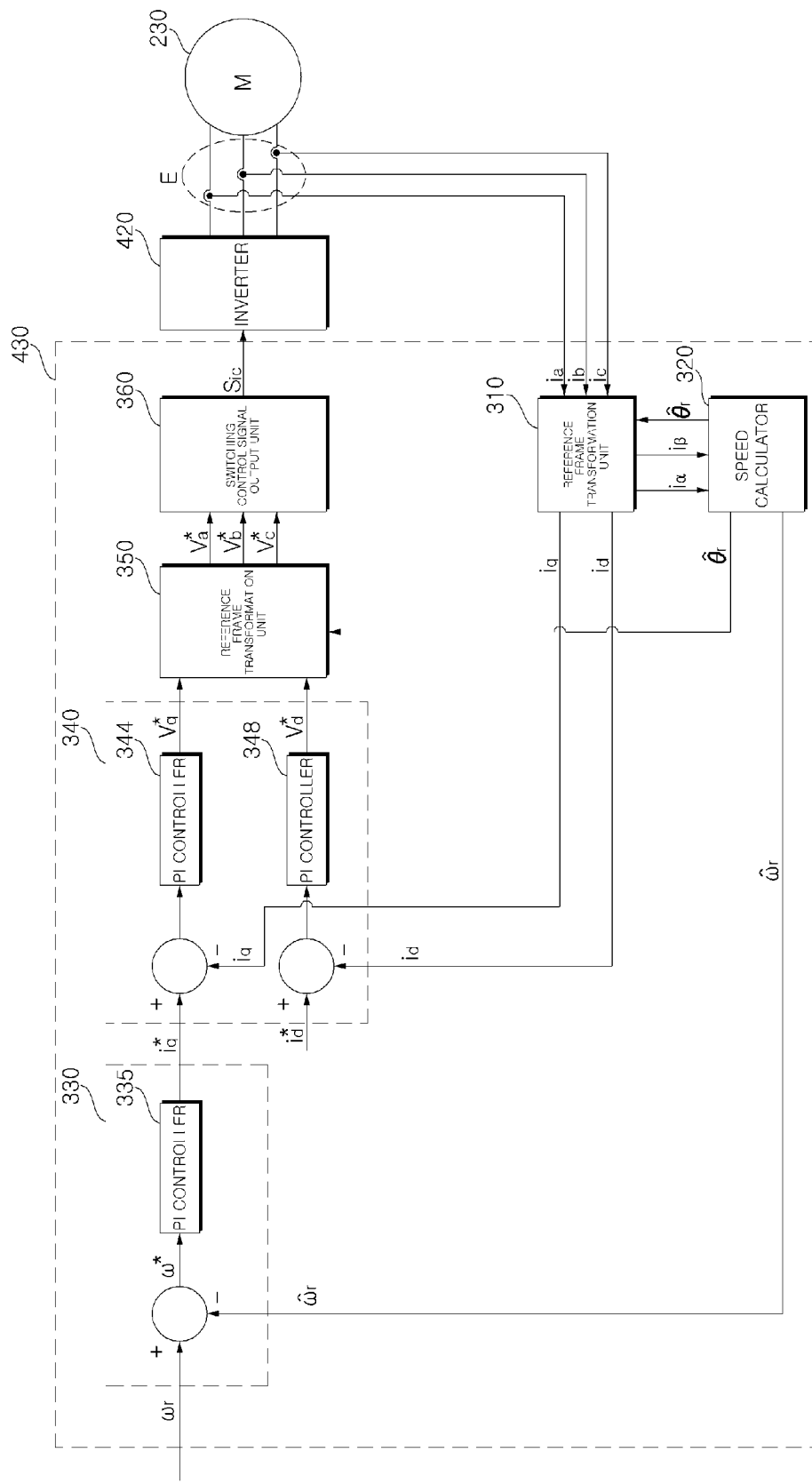
FIG. 3 is an internal block diagram illustrating the inverter controller of FIG. 2.

FIG. 3 is an internal block diagram illustrating an inverter controller of FIG. 2.

Referring to FIG. 3, the inverter controller 430 may include a reference frame transformation unit 310, a speed calculator 320, a current command generator 330, a voltage command generator 340, a reference frame transformation unit 350, and a switching control signal output unit 360.

The reference frame transformation unit 310 receives the 3-phase output currents (ia, ib, ic) detected by the output current detector E, and transforms the same into 2-phase currents (iα, iβ) in a stationary reference frame.

The reference frame transformation unit 310 may transform 2-phase currents (iα, iβ) in the stationary reference frame to 2-phase currents (id, iq) in a rotating coding system.

The speed calculator 320 may output a position $\hat{\theta}_r$ and a speed $\hat{\omega}_r$ calculated based on the 2 phase currents (iα, iβ) of the stationary reference frame that are frame-transformed by the reference frame transformation unit 310.

The current command generator 330 generates a current command value $i^*_q$ based on the calculated speed $\hat{\omega}_r$ and a speed command value $\omega'_r$. For example, the current command generator 330 may perform PI control in a PI controller 335 and generate the current command value $i^*_q$ based on the difference between the calculated speed $\hat{\omega}_r$ and the speed command value $\omega^*_r$. While FIG. 3 illustrates a q-axis current command value $i^*_q$ as a current command value, a d-axis current command value $i^*_d$ may also be generated. The d-axis current command value $i^*_d$ may be set to 0.

The current command generator 330 may further include a limiter (not shown) for limiting the level of the current command value $i^*_q$ such that the current command value $i^*_q$ does not exceed an allowable range.

Next, the voltage command generator 340 generates d-axis and q-axis voltage command values $v^*_d$ and $v^*_q$ based on the d-axis and q-axis currents $i_d$ and $i_q$ which are transformed into currents in the 2-phase rotating reference frame by the reference frame transformation unit and the current command values $i^*_d$ and $i^*_q$ from the current command generator 330. For example, the voltage command generator 340 may perform PI control in a PI controller 344 and generate a q-axis voltage command value $v^*_q$ based on the difference between the q-axis current $i_q$ and the q-axis current command value $i^*_q$. In addition, the voltage command generator 340 may perform PI control in a PI controller 348 and generate the d-axis voltage command value $v^*_d$ based on the difference between the d-axis current $i_d$ and the d-axis current command value $i^*_d$. The voltage command generator 340 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are input to the reference frame transformation unit 350.

The reference frame transformation unit 350 receives the position $\hat{\theta}_r$ calculated by the speed calculator 320 and the d-axis and q-axis voltage command values $v^*_d$ and $v^*_q$ and performs reference frame transformation.

The reference frame transformation unit 350 transforms a 2-phase rotating reference frame into a 2-phase stationary reference frame. The transformation may be performed using the position $\hat{\theta}_r$ calculated by the speed calculator 320.

The reference frame transformation unit 350 may also transform the 2-phase stationary reference frame into a 3-phase stationary reference frame. Through such transformation, the reference frame transformation unit 350 outputs 3-phase output voltage command values v*a, v*b, and v*c.

The switching control signal output unit 360 outputs a PWM inverter switching control signal Sic based on the 3-phase output voltage command values v*a, v*b, and v*c.

The output inverter switching control signal Sic is transformed into a gate drive signal in a gate drive unit (not shown) and then input to the gate of each switching element in the inverter 420. Thereby, the switching elements Sa, S'a, Sb, S'b, Sc, and S'c in the inverter 420 perform the switching operation.

As described above, it is essential for the motor driving apparatus 220 to sense an output current io flowing to the motor, particularly, a phase current in order to perform vector control for driving the motor 230 through control of the inverter 420.

The inverter controller 430 may control the motor 230 to produce a desired speed and a desired torque using the current command generator 330 and the voltage command generator 340 based on the sensed phase current.

Figure 4:
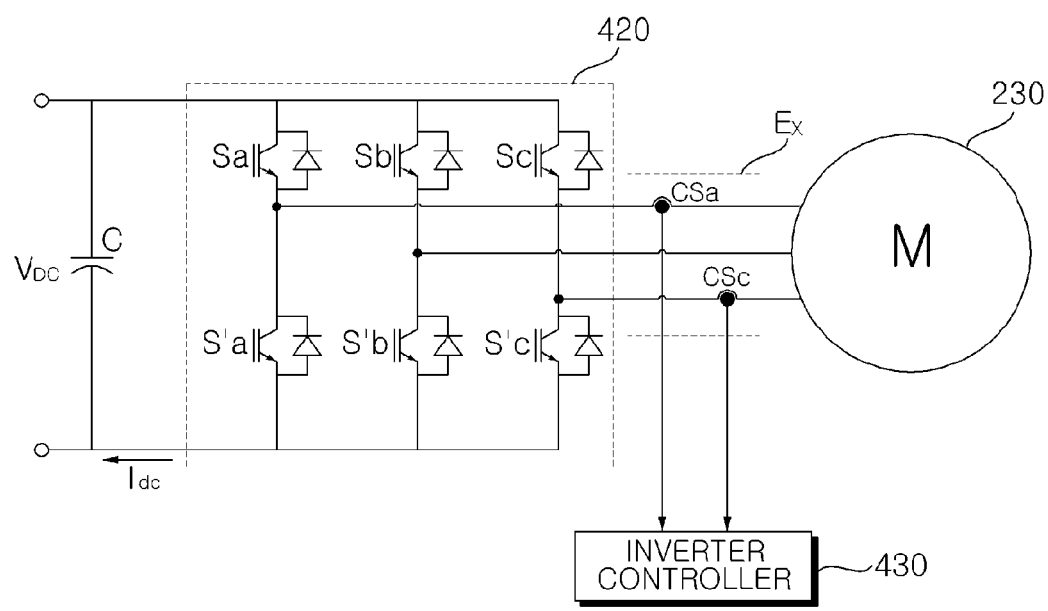
FIG. 4 is a diagram illustrating an example of the output current detector of FIG. 2.

FIG. 4 is a diagram illustrating an example of the output current detector of FIG. 2.

Referring to FIG. 4, the output current detector Ex of FIG. 4 includes two current sensors CSa and CSc for sensing, among 3 phase currents (a-, b-, and c-phase currents) flowing through the motor 230, the a-phase current and the c-phase current.

The b-phase current may be calculated on the condition that the sum of the three phase currents is 0.

Figure 5:
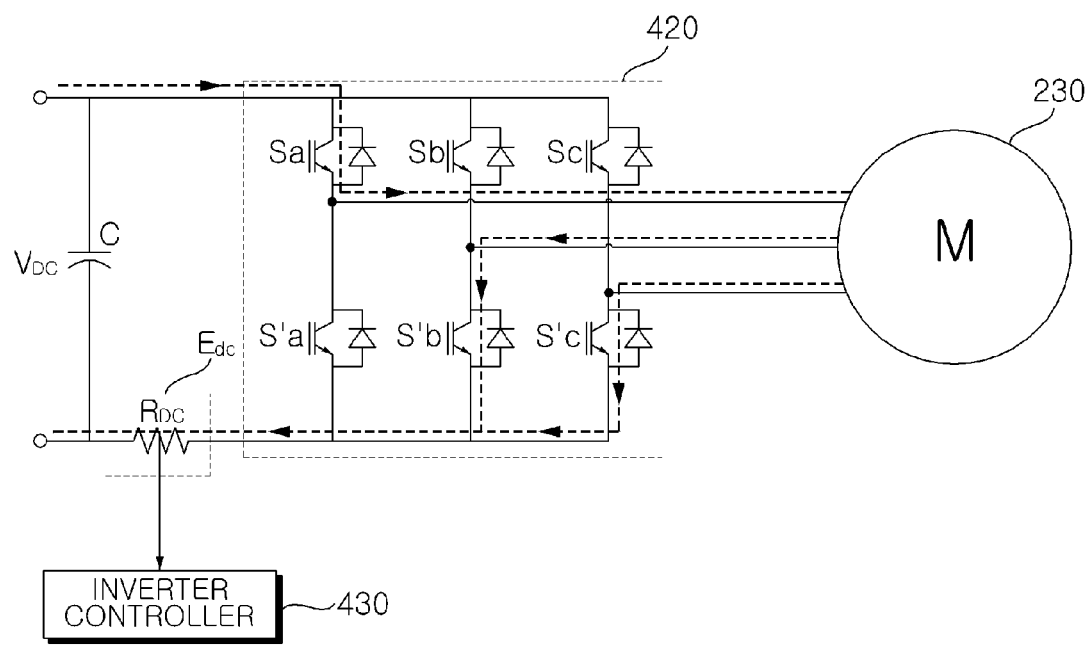
FIG. 5 is a diagram illustrating an exemplary output current detector of a motor driving apparatus according to an embodiment of the present invention.

The method of sensing the motor current using one DC link resistor as shown in FIG. 5 is better than the method of FIG. 4 in reducing manufacturing costs and facilitating apparatus installation.

Accordingly, in the present invention, description will be given, focusing on the method of sensing a motor current using one shunt resistor as shown in FIG. 5.

FIG. 5 is a diagram illustrating an exemplary output current detector of a motor driving apparatus according to an embodiment of the present invention.

Referring to FIG. 5, an output current detector Edc may include a DC link resistor Rdc disposed between the DC link capacitor C and the inverter 420.

The inverter controller 430 may calculate a current flowing through the motor 230 based on the current flowing through the DC link resistor Rdc, and control the inverter 420 based on the calculated motor current.

The current acquisition method using the DC link resistor Rdc as shown in FIG. 5 is referred to as a shunting algorithm.

The shunting algorithm is divided into 1-shunt, 2-shunt, and 3-shunt schemes according to the positions and number of shunt resistors. The shunting algorithm focused on in the present invention is the 1-shunt scheme.

According to the 1-shunt scheme, 3 phase currents (a, b and c phase currents) flowing through the motor 230 are acquired using only one shunt resistor disposed on the DC link.

Accordingly, this scheme may reduce the number of current sensors compared to the method of FIG. 4, and may reduce the number of nearby circuits such as a voltage the amplifier and an A/D port compared to the 2-shunt and 3-shunt methods. In addition, the 1-shunt scheme may reduce the manufacturing costs and volume of the motor driving apparatus 220.

The motor driving apparatus 220 detects a phase current using one DC link resistor disposed between the DC link capacitor and the inverter, and the inverter controller 430 estimates the phase current in an interval in which phase current detection is impossible, based on a phase current sampled through the selected resistor.

As the phase current is detected through time division using one DC link resistor, manufacturing costs may be reduced and apparatus installation may be facilitated.

The inverter controller 430 controls a switching element in the inverter through space vector-based pulse width modulation control, and estimates a phase current based on the phase current sampled through the DC resistor in an interval in which phase current detection is impossible within the period of pulse width modulation control as the voltage vector application time is shorter than the minimum voltage application time. Thereby, it is not necessary to intentionally shift the switching timing of the inverter switching element. Therefore, noise may not occur and thus the phase current may be accurately calculated.

The inverter controller 430 may estimate, in the interval in which phase current detection is not possible, a phase current based on a phase current sampled through the DC link resistor, a phase current gradient according to the switching pattern of the switching element in the inverter and a voltage vector application time according to a voltage command value.

In estimating the phase current, the inverter controller 430 may estimate an average phase current.

The inverter controller 430 may control the switching element in the inverter in the manner of space vector-based pulse width modulation control. The inverter controller 430 may detect 2 phase currents of 3 phase currents flowing through the motor at different times in the interval in which phase current detection is possible during the pulse width modulation control period. The inverter controller 430 may calculate the other phase current based on the two detected phase currents.

The inverter controller 430 may perform current compensation for the 3-phase current, which is detected and calculated at different times, with respect to a first time within the pulse width modulation control period, and control the inverter based on the current-compensated 3-phase current. Thereby, accuracy of controlling the inverter may be further enhanced.

The inverter controller 430 may estimate a phase current based on a phase current sampled through the DC link resistor in the interval in which phase current detection is not possible, without turn-on timing shift of the switching element of the inverter.

Figure 6:
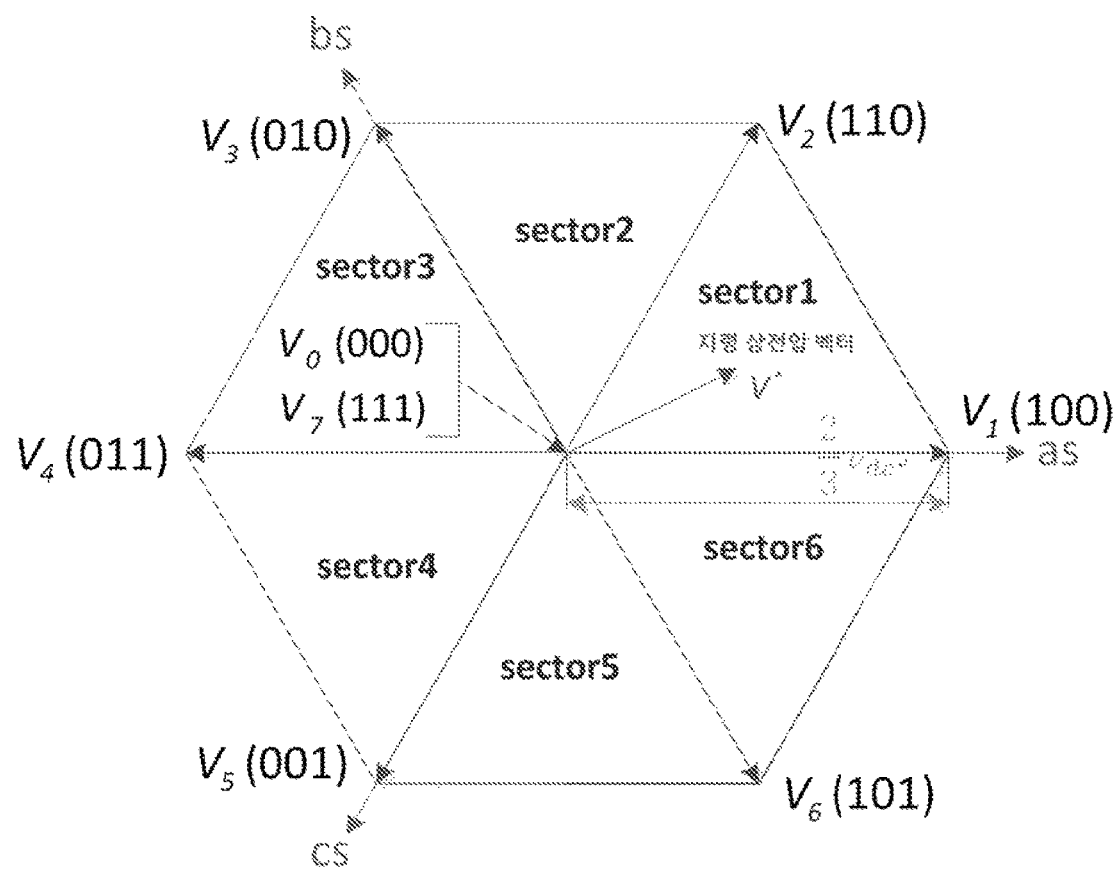
FIG. 6 illustrates space vector-based voltage vectors according to a switching combination of respective switching elements in an inverter.

FIG. 6 illustrates space vector-based voltage vectors according to a switching combination of respective switching elements in an inverter.

Referring to FIG. 6, when all upper switching elements Sa, Sb and Sc in the inverter 420 are in the On state, this corresponds to the zero vector of V0 (111). When all lower switching elements S'a, S'b and S'c are in the On state, this corresponds to the zero vector of V7 (000). That is, two space vectors exist in a space vector region 800.

Additionally, the figure illustrates six effective vectors V1 to V6.

FIGS. 7A to 7F are diagrams illustrating switching of respective switching elements in the inverter corresponding to the zero vector and the effective vector of FIG. 6.

Figure 7B:
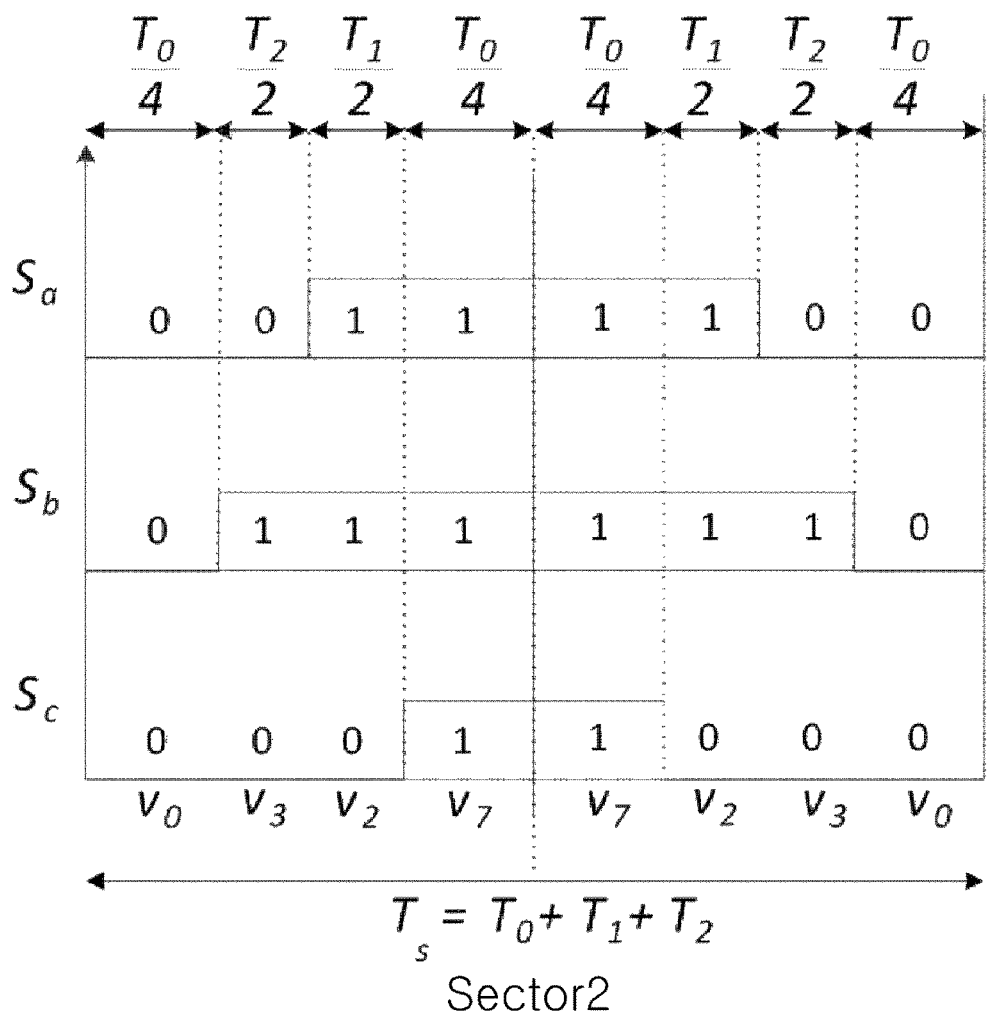
Figure 7C:
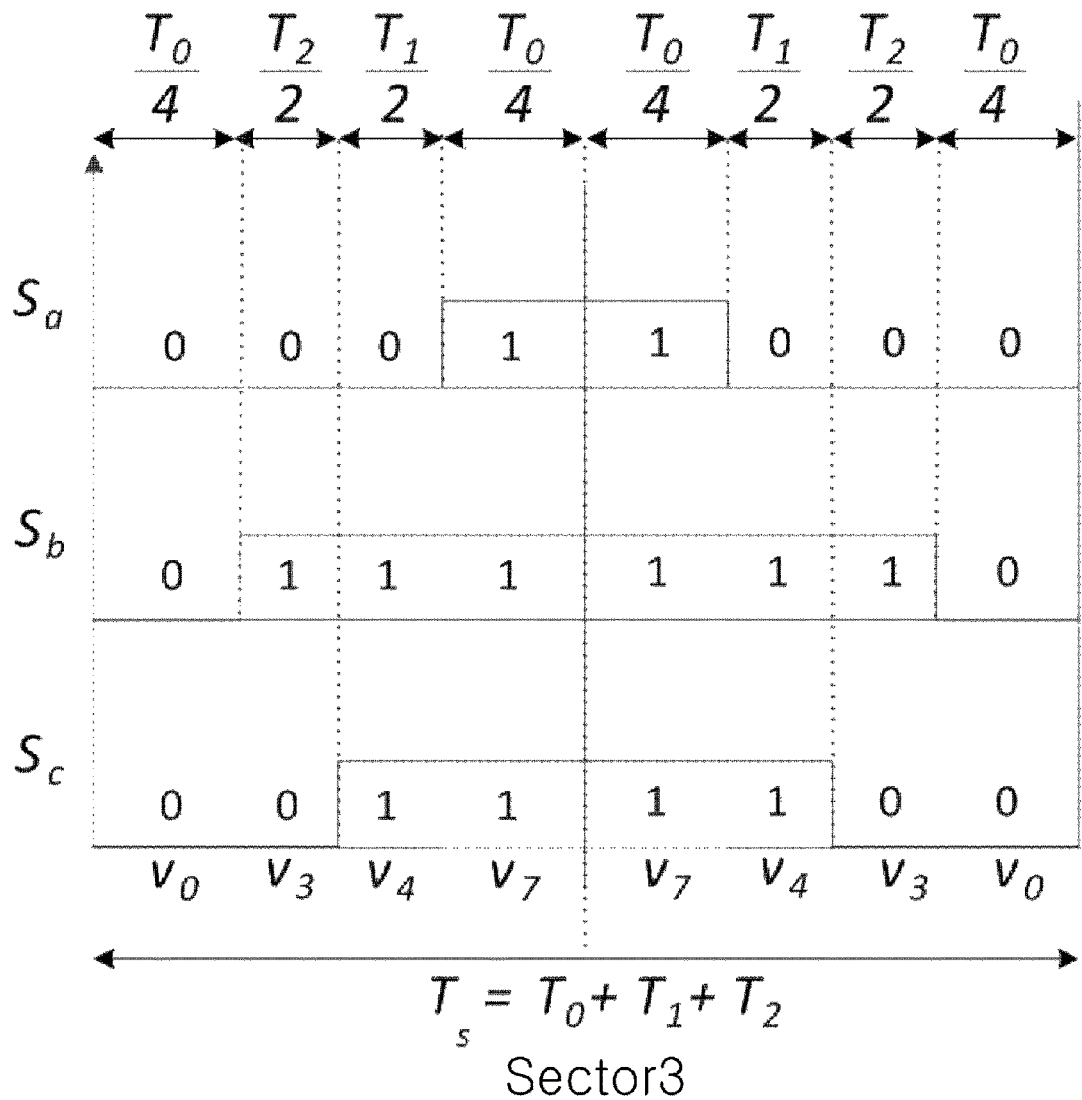
Figure 7D:
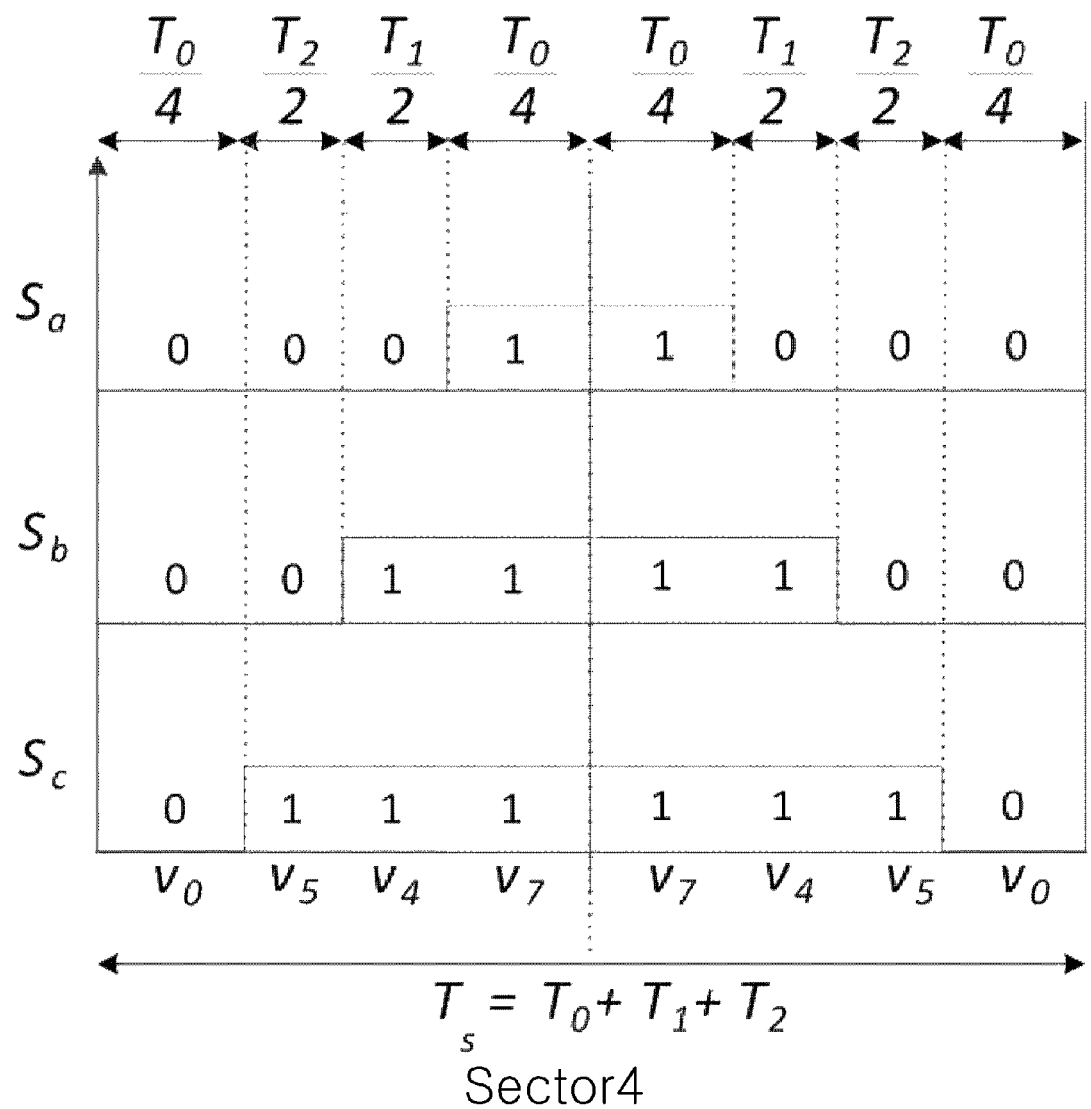
Figure 7E:
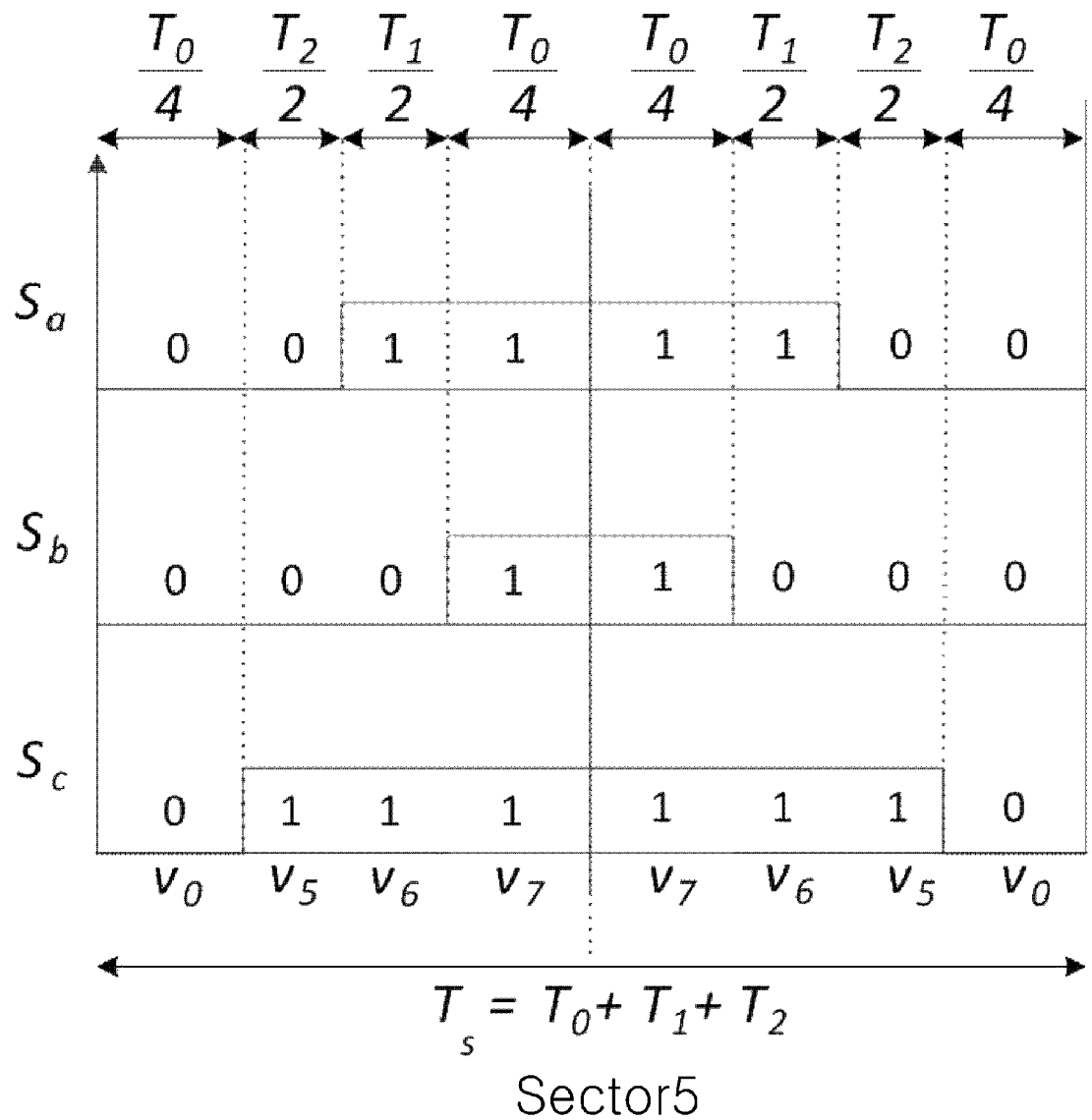
Figure 7F:
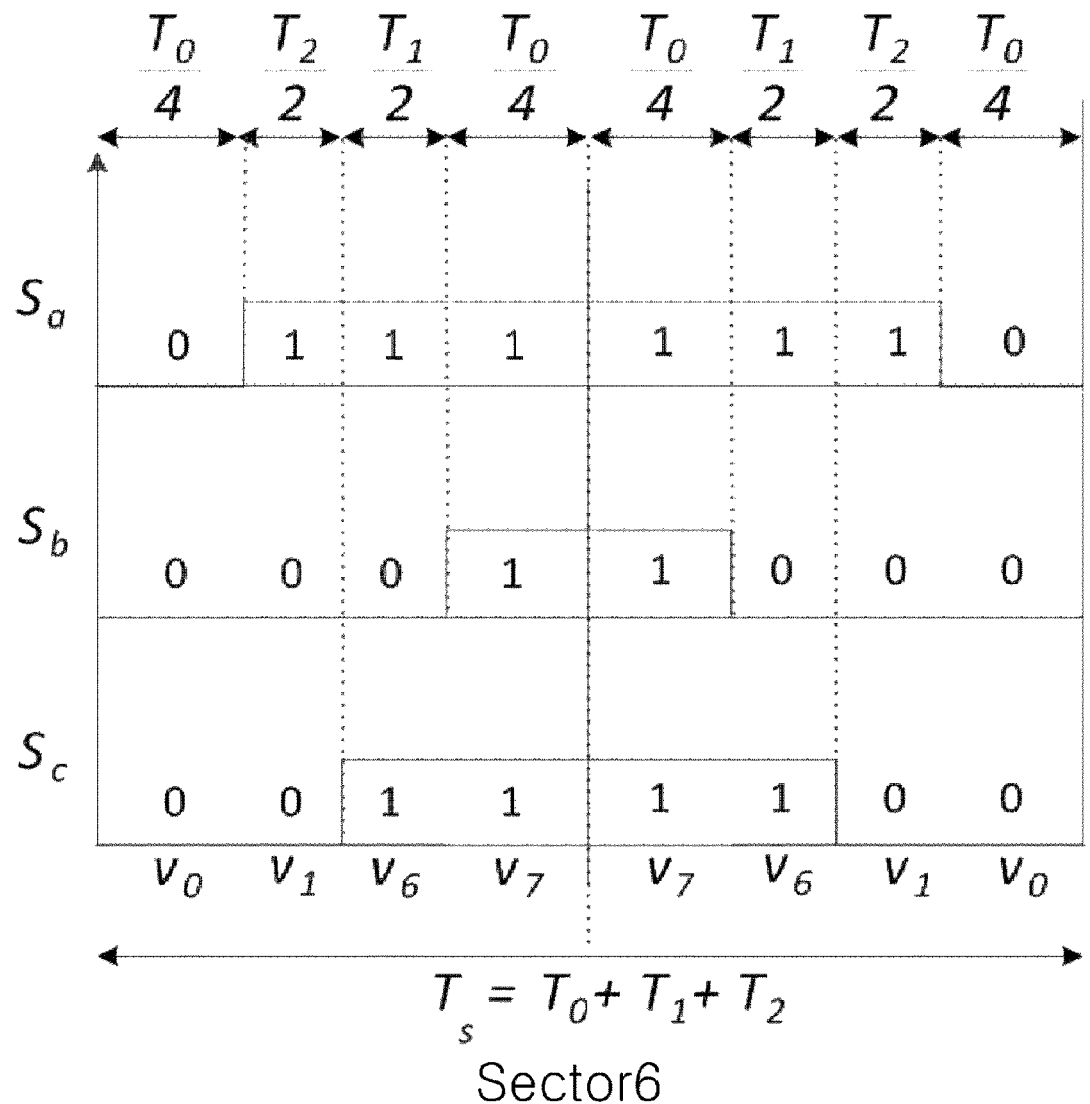

Referring to FIGS. 7A to 7F, FIG. 7A illustrates switching timing of the switching elements Sa, Sb and Sc of the inverter in sector 1 of FIG. 6, FIG. 7B illustrates switching timing of the switching elements Sa, Sb and Sc of the inverter in sector 2 of FIG. 6, and FIG. 7C illustrates switching timing of the switching elements Sa, Sb and Sc of the inverter in sector 3 of FIG. 6. FIG. 7D illustrates switching timing of the switching elements Sa, Sb and Sc of the inverter in sector 4 of FIG. 6, FIG. 7E illustrates switching timing of the switching elements Sa, Sb and Sc of the inverter in sector 5 of FIG. 6, and FIG. 7F illustrates switching timing of the switching elements Sa, Sb and Sc of the inverter in sector 6 of FIG. 6.

FIG. 8 illustrates statuses of motor currents detected through a DC resistor for the respective vectors of FIG. 6.

Referring to FIG. 8, Ias, which denotes a-phase current, is detected for the effective vector V1 in sector 1 through a DC link resistor Rdc, and −Ics, which denotes c-phase current, is detected for the effective vector V2 in sector 2 through the DC link resistor Rdc. Ibs, which denotes b-phase current, is detected for the effective vector V3 in sector 3 through the DC link resistor Rdc, and −Ias, which denotes a-phase current, is detected for the effective vector V4 in sector 4 through the DC link resistor Rdc. Ics, which denotes a c-phase current, is detected for the effective vector V5 in sector 5 through the DC link resistor Rdc, and −Ibs, which denotes b-phase current, is detected for the effective vector V6 in sector 6 through the DC link resistor Rdc.

It is not possible to detect currents for vectors V0 and V7, which are zero vectors, through the DC link resistor Rdc.

Figure 9A:
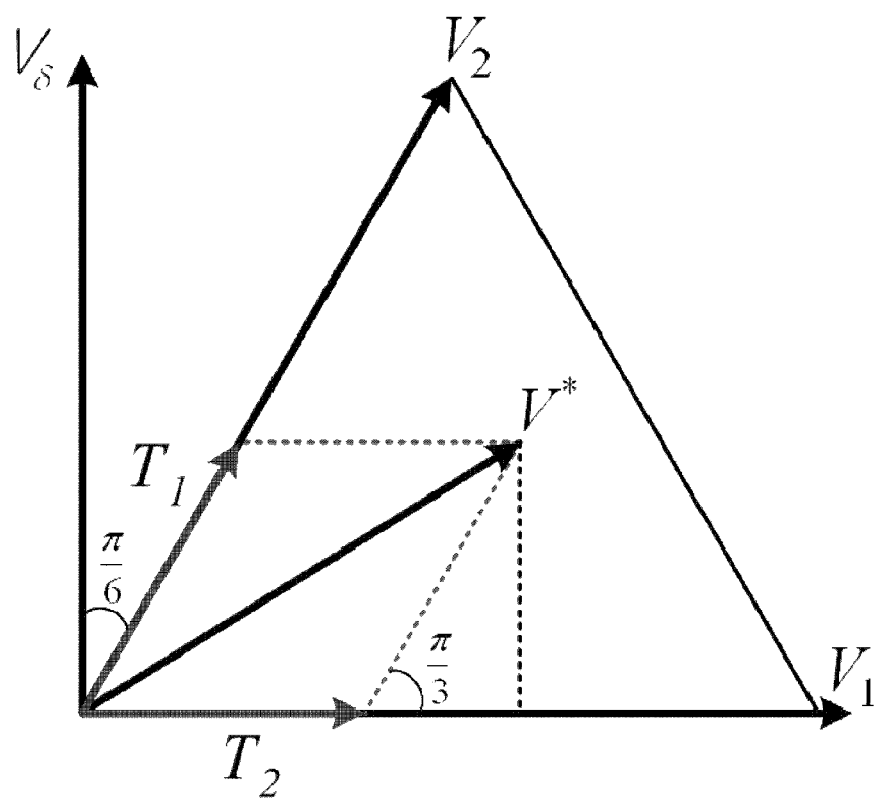
FIG. 9A illustrates exemplary voltage vectors.
Figure 9B:
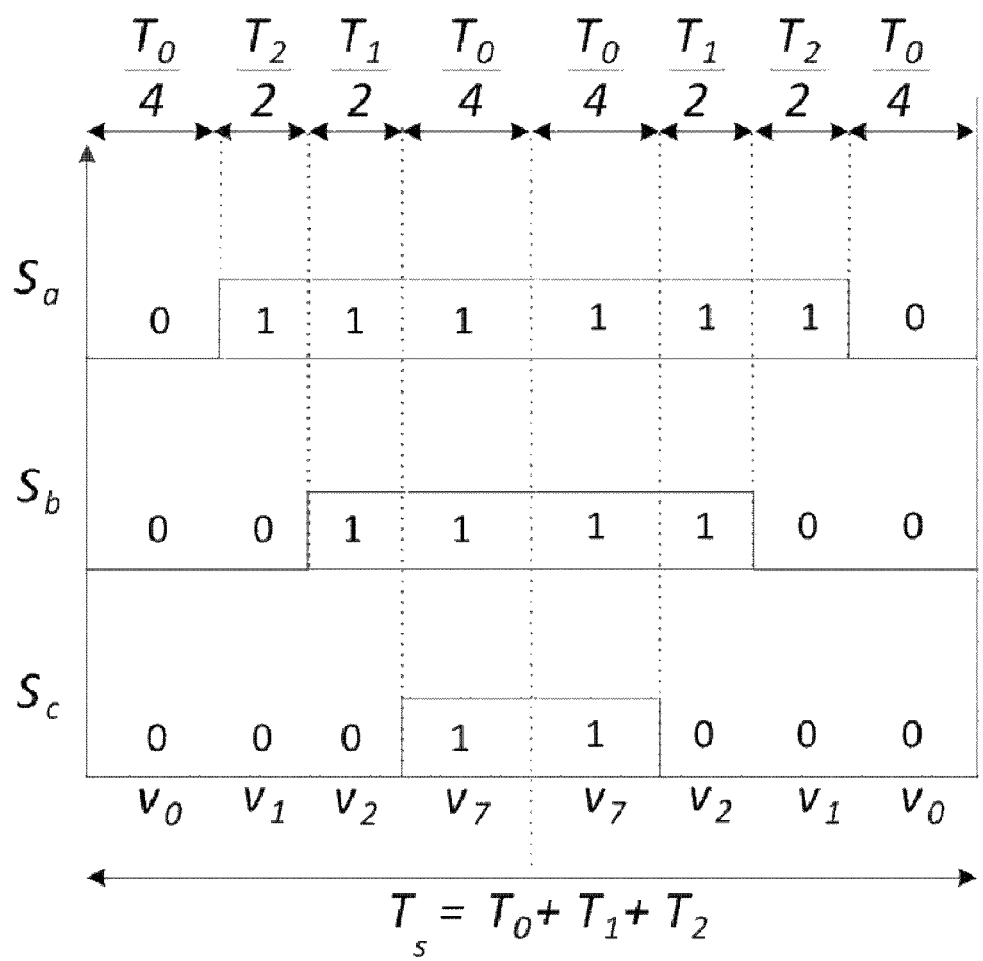
FIG. 9B illustrates switching of respective switching elements in the inverter corresponding to the voltage vectors of FIG. 9A.

FIG. 9A illustrates exemplary voltage vectors, and FIG. 9B illustrates switching of respective switching elements in the inverter corresponding to the voltage vectors of FIG. 9A.

Referring to FIG. 9A, a voltage vector V* may be generated by a combination of the effective vector V1 and V2 in sector 1. The voltage vector V* may be generated by the voltage command generator 340.

According to the 1-shunt scheme, when an effective vector is applied in a control period Ts for a space vector-based PWM (SVPWM), a phase current is detected from the DC link resistor Rdc, analog-to-digital (A/D) conversion is applied to the detected phase current, and the current sector and the effective vector are determined by a gate signal generator (not shown) in the switching control signal output unit 360 to restore the phase current.

Since the vector is applied within one period Ts, two phase currents may be restored, and the other phase current may be estimated based on the fact that the sum of the three phase currents is 0.

Figure 10:
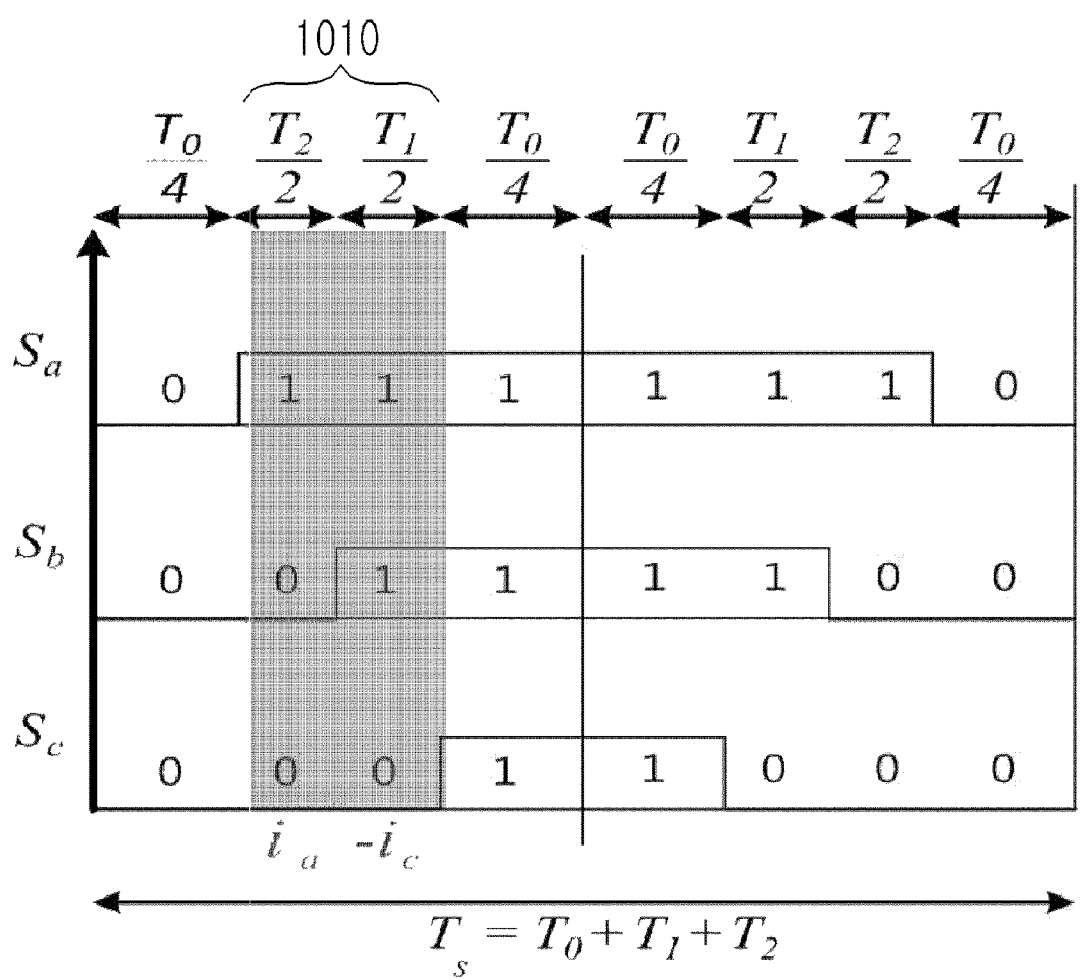
FIG. 10 is a diagram illustrating switching of respective switching elements in the inverter in accordance with a first effective vector and a second effective vector.

FIG. 10 is a diagram illustrating switching of respective switching elements in the inverter in accordance with a first effective vector and a second effective vector.

Hereinafter, a description will be given, focusing on the period 1010 of application of the first effective vector and the second effective vector.

In FIG. 10, the first effective vector is V1 (100), and thus the a-phase current ia is detected during the time T2/2. Then, for the next effective vector V2 (110), the c-phase current −ic is detected during the time T1/2.

The other phase (b-phase) current ib is obtained through internal calculation in the inverter controller 430. The inverter controller 430 performs vector control using the 3-phase currents obtained in this manner.

Restoration of a phase current using the DC link resistor Rdc is basically implemented by sensing a current flowing through the DC link resistor Rdc in the effective vector interval.

If the interval in which effective vectors are applied is short, it may be difficult to sense current flowing through the DC link resistor Rdc.

When a switching element in the inverter 420 performs a switching operation, a problem may be caused due to a settling time $T_{settling}$ according to a ringing phenomenon in the switching operation, a dead time $T_{dead}$ of the inverter 420, and an A/D conversion time $T_{A/D}$. Accordingly, to detect a normal current, sampling needs to be performed after these times pass.

The minimum effective vector application time $T_{min}$ for detecting a current flowing through the DC link resistor Rdc is given as Equation 1 below.

$$T_{min} = T_{dead} + T_{settling} + T_{A/D} \qquad \text{Equation 1}$$

That is, the minimum voltage vector application time $T_{min}$ may correspond to the sum of the settling time $T_{settling}$ according to a ringing phenomenon occurring during the switching operation of a switching element in the inverter, the dead time $T_{dead}$ of the inverter, and the A/D conversion time $T_{A/D}$ for sampling.

Description will be given of the case where the effective vector is applied for a time shorter than the minimum effective vector application time, with reference to FIGS. 11A to 11D.

Figure 11A:
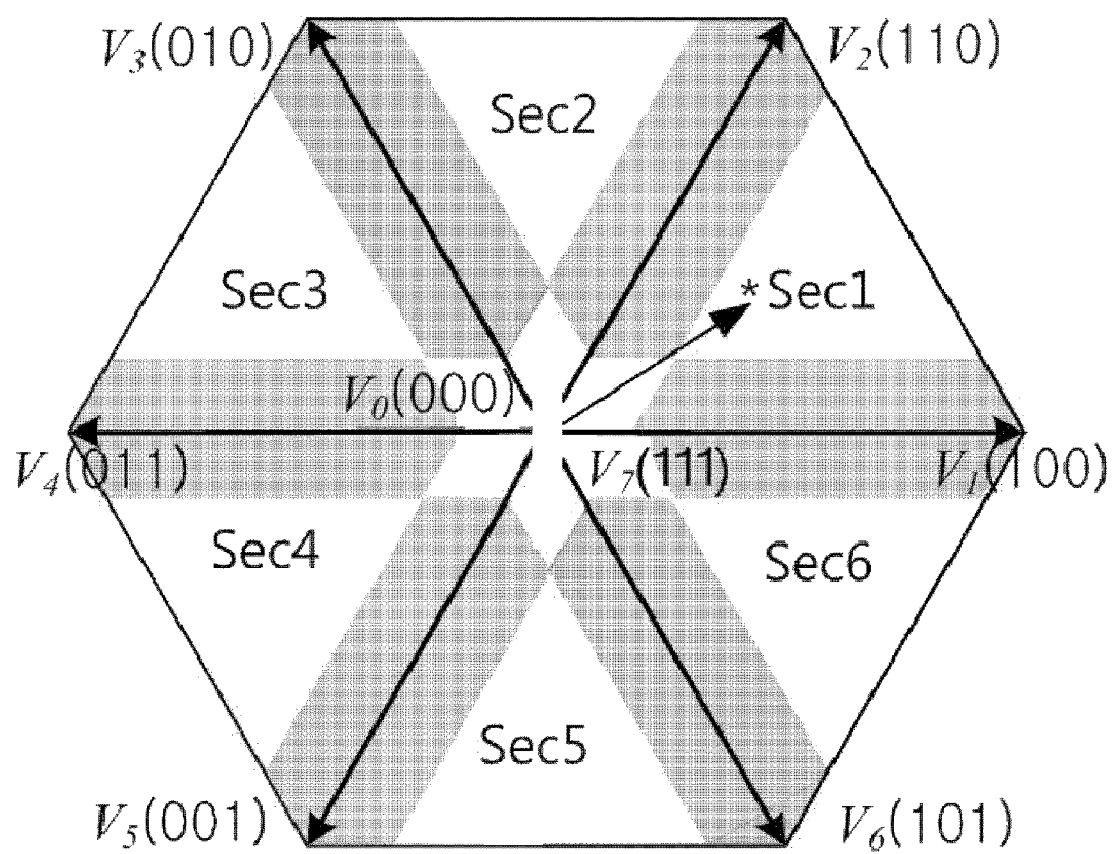
FIGS. 11A and 11B illustrate application of an effective vector for a time shorter than the minimum effective vector application time.
Figure 11B:
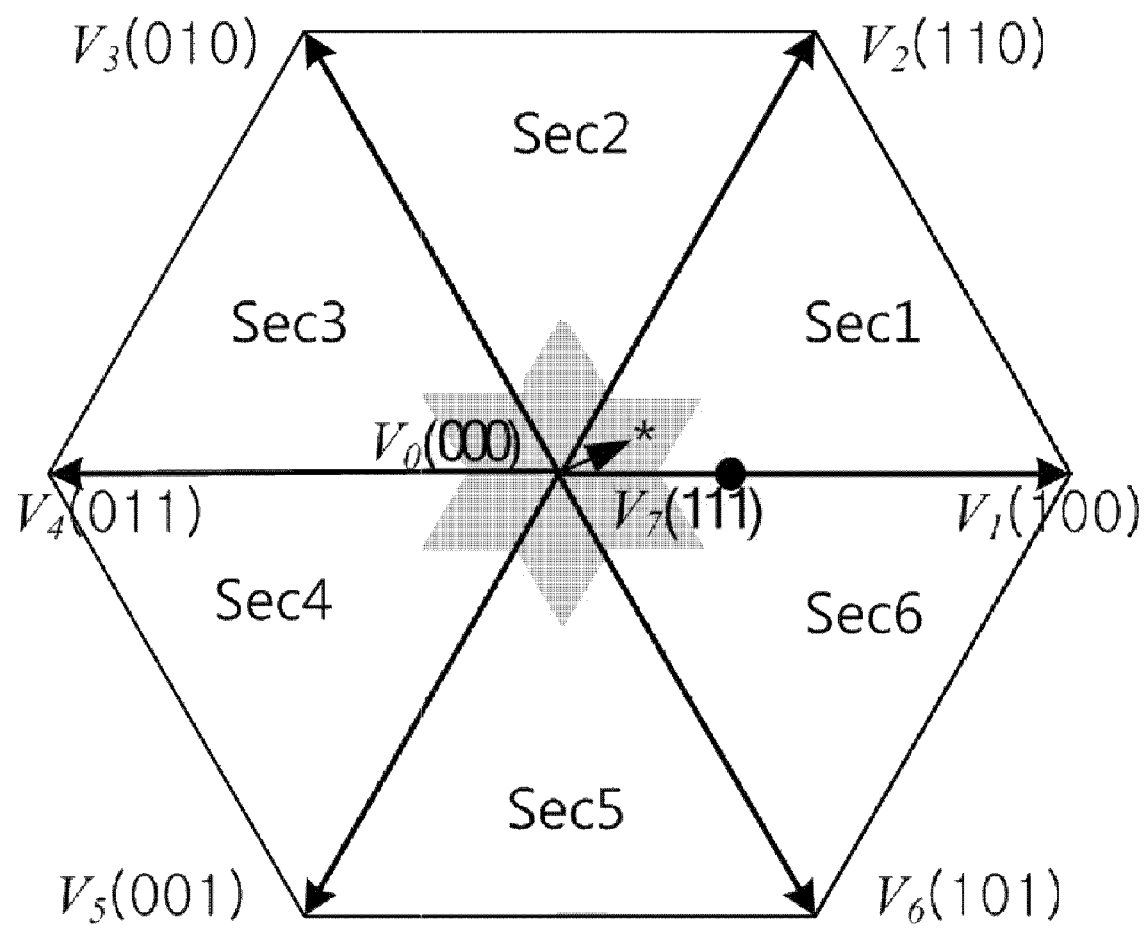

FIGS. 11A and 11B illustrate a case where the effective vector is applied for a time shorter than the minimum effective vector application time.

FIG. 11A illustrates a case where the application time for one effective vector is shorter than the minimum effective vector application time $T_{min}$ within one switching period according to a space vector-based PWM (SVPWM) hexagon.

According to FIG. 11A, a region in which detection and measurement of a current through the DC link resistor Rdc is not possible is present in the areas Ar1 to Ar6 around vectors V1 to V6. This region may be referred to as a measurement disabled region or a dead band.

FIG. 11B illustrates a case where the application time for one effective vector is shorter than the minimum effective vector application time $T_{min}$ within one switching period according to a space vector-based PWM (SVPWM) hexagon.

Referring to FIG. 11B, a region in which detection and measurement of a current through the DC link resistor Rdc is not possible is present in a zero vector surrounding area Ara.

Figure 11C:
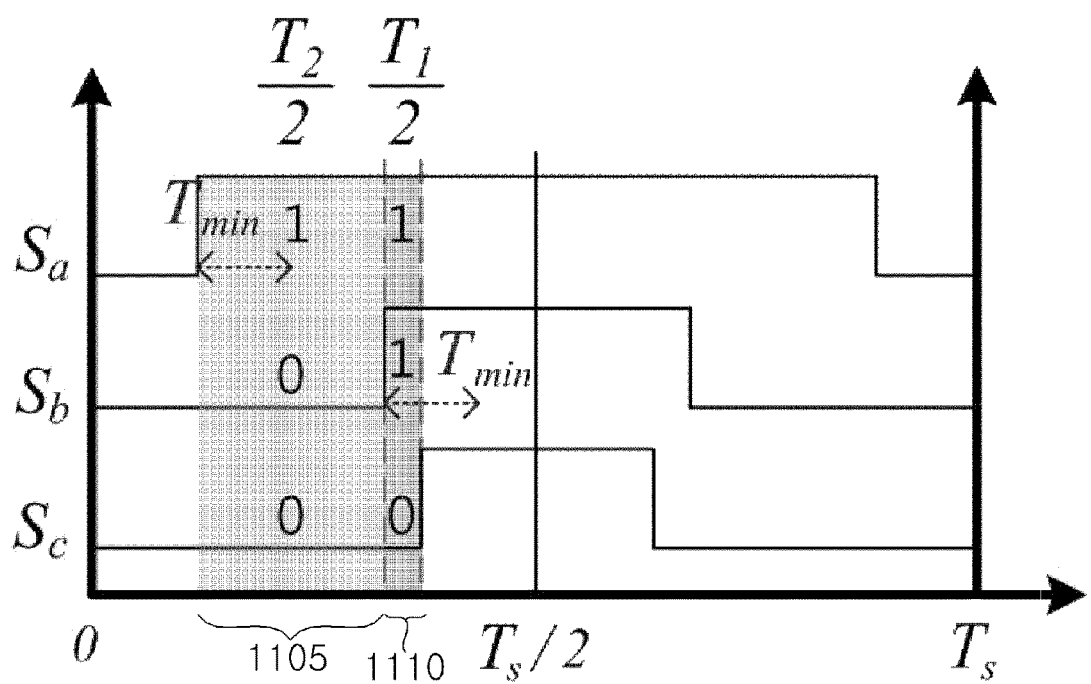
FIGS. 11C and 11D illustrate the switching of the respective switching elements in the inverter corresponding to voltage vectors in an interval in which current detection is not possible.
Figure 11D:
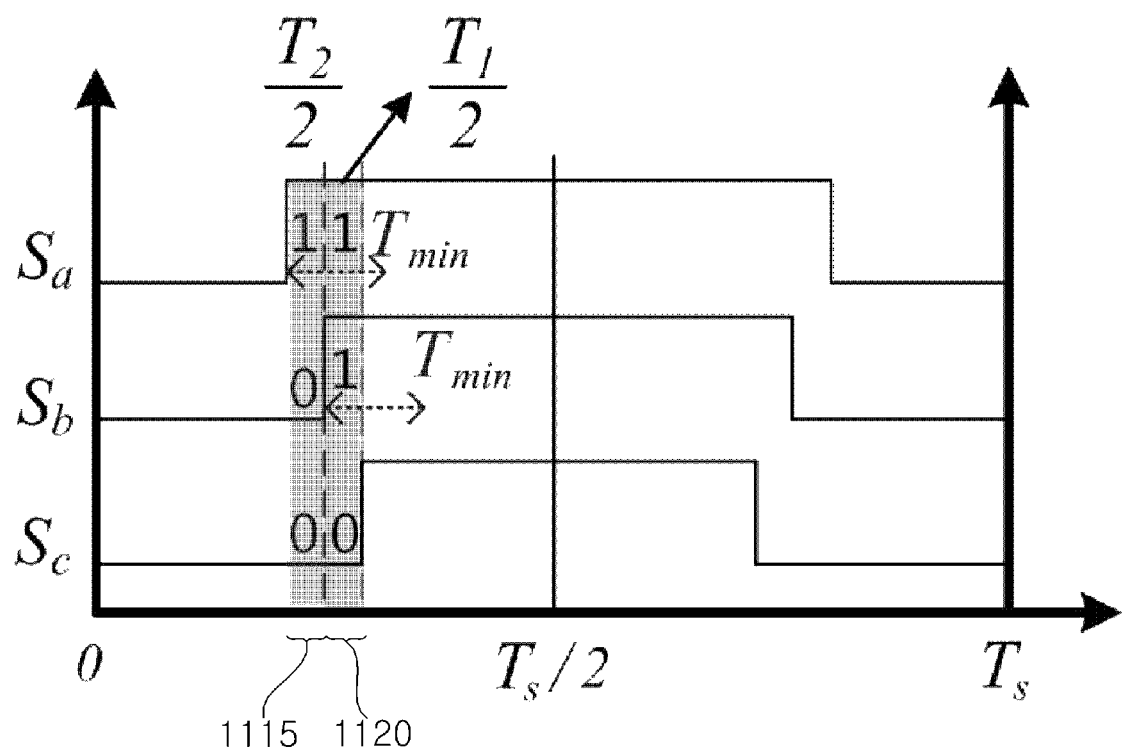

FIGS. 11C and 11D illustrate the switching operation of the respective switching elements in the inverter corresponding to voltage vectors in an interval in which current detection is not possible.

Referring to FIG. 11C, the interval of T2/2 1105 according to vector V1 (100) is longer than $T_{min}$, but the interval of T1/2 1110 according to vector V2 (110) is shorter than $T_{min}$. Thereby, the a-phase current is detectable in the interval of T2/2, but the c-phase current is not detectable in the interval of T1/2.

Referring to FIG. 11D, both the interval of T2/2 1115 according to vector V1 (100) and the interval of T1/2 1120 according to vector V2 (110) are shorter than $T_{min}$. Thereby, neither the a-phase current nor the c-phase current is detectable in the T2/2 interval and the T1/2 interval.

According to one conventional method, current detection is not performed in a region in which current detection is impossible. However, if current detection is not performed, accurate motor control may not be performed.

According to another conventional method, the minimum effective vector application time $T_{min}$ is secured in order to prevent occurrence of a region in which current detection is not possible. According to this method, symmetrical switching timing is intentionally changed to asymmetrical switching timing, or turn-on timing is intentionally shifted. Accordingly, voltage vectors may be instantaneously distorted, and thus noise may occur.

According to an embodiment of the present invention, in order to solve the aforementioned problem, the switching elements of the inverter are turned on/off based on a set voltage vector without voltage vector distortion caused by, for example, turn-on timing shift, while a current is estimated based on a current estimation technique in a region in which current detection is impossible. Specifically, the current is estimated using a detected current value.

That is, in the present invention, it is proposed that an average current be estimated using an application time and a gradient of a current according to a current switching pattern.

This method is applicable to both a case where two effective vector application times are shorter than the minimum effective vector application time $T_{min}$ and a case where one effective vector application time is shorter than the minimum effective vector application time $T_{min}$.

Hereinafter, description will be given of the case where two effective vector application times are shorter than the minimum effective vector application time $T_{min}$.

When a voltage command value V* is located in sector 6, the gradients of a b-phase current according to the switching statuses that are estimated based on the Thevenin's theorem are given as shown in FIGS. 12A to 12D.

FIGS. 12A to 12D illustrate motor equivalent circuits according to switching of switching elements in the inverter.

FIG. 12A illustrates a Thevenin equivalent circuit with respect to a b-phase current in accordance with the zero vector V0 (000).

FIG. 12A(a) illustrates a circuit for the motor 230 when switching of a switching element in the inverter 420 is performed in accordance with the zero vector V0 (000).

FIG. 12A(b) illustrates Thevenin equivalent impedance Lth for the motor 230, and FIG. 12A(c) illustrates Thevenin equivalent voltage Vth for the motor 230.

The Thevenin equivalent impedance Lth and the Thevenin equivalent voltage Vth are summarized by Equations 2 and 3 below.

$$L_{th} = \frac{L*L}{L+L} = \frac{L}{2} \qquad \text{Equation 2}$$

Herein, L denotes motor inductance.

$$2L\frac{di_1}{dt} + V_c - V_a = 0, \quad L\frac{di_1}{dt} = \frac{V_a - V_c}{2} \qquad \text{Equation 3}$$

$$V_{th} = -V_a + L\frac{di_1}{dt}$$

$$V_{th} = -V_a \frac{V_a - V_c}{2} = \frac{-V_a - V_c}{2} = \frac{V_b}{2}$$

Herein, Va denotes an a-phase voltage, Vb denotes a b-phase voltage, and Vc denotes a c-phase voltage.

FIG. 12A(d) shows an equivalent circuit for FIG. 12A(a) based on Thevenin's principle of equivalency.

According to the equivalent circuit, Equation 4 below may be established for a voltage.

$$\frac{3}{2}L\frac{di_b}{dt} + \frac{3}{2}V_b = 0, \quad \frac{di_b}{dt} = \frac{-V_b}{L} \qquad \text{Equation 4}$$

Herein, $i_b$ denotes a b-phase current, and $$\frac{di_b}{dt}$$

denotes the gradient of the b-phase current.

FIG. 12B illustrates a Thevenin equivalent circuit with respect to the b-phase current in accordance with the effective vector V1 (100).

FIG. 12B(a) illustrates a circuit for the motor 230 when the switching elements in the inverter 420 perform the switching operation in accordance with the effective vector V1 (100).

FIG. 12B(b) illustrates Thevenin equivalent impedance Lth for the motor 230, and FIG. 12B(c) illustrates Thevenin equivalent voltage Vth for the motor 230.

The Thevenin equivalent impedance Lth and the Thevenin equivalent voltage Vth are summarized by Equations 5 and 6 below.

$$L_{th} = \frac{L*L}{L+L} = \frac{L}{2} \qquad \text{Equation 5}$$

Herein, L denotes motor inductance.

$$2L\frac{di_1}{dt} + V_a - V_c - V_{dc} = 0, \; L\frac{di_1}{dt} = \frac{V_{dc} + V_c - V_a}{2} \qquad \text{Equation 6}$$

$$V_{th} = -V_c + L\frac{di_1}{dt}$$

$$V_{th} = -V_c + \frac{V_{dc} + V_c - V_a}{2} = \frac{V_{dc} - V_c - V_a}{2} = \frac{V_{dc} + V_b}{2}$$

Herein, Va denotes an a-phase voltage, Vb denotes a b-phase voltage, and Vc denotes a c-phase voltage.

FIG. 12B(d) shows an equivalent circuit for FIG. 12B(a) based on Thevenin's principle of equivalency.

According to the equivalent circuit, Equation 7 below may be established.

$$\frac{3}{2}L\frac{di_b}{dt} + V_b + \frac{V_{dc} + V_b}{2} = 0, \qquad \text{Equation 7}$$

$$\frac{di_b}{dt} = \frac{-3V_b - V_{dc}}{3L}$$

Herein, $i_b$ denotes a b-phase current, $V_{dc}$ denotes a DC link voltage, and $$\frac{di_b}{dt}$$

denotes the gradient of the b-phase current.

Figure 12C:
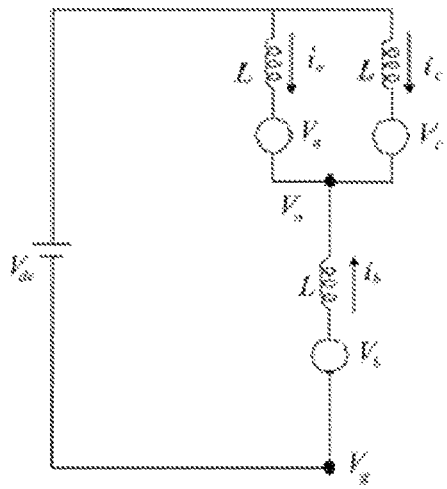
FIGS. 12A(a), 12A(b), 12A(c), 12A(d), 12B(a), 12B(b), 12B(c), 12B(d), 12C(a), 12C(b), 12C(c), 12C(d), 12D(a), 12D(b), 12D(c), and 12D(d) illustrate motor equivalent circuits according to switching of switching elements in the inverter.
Figure 12C:
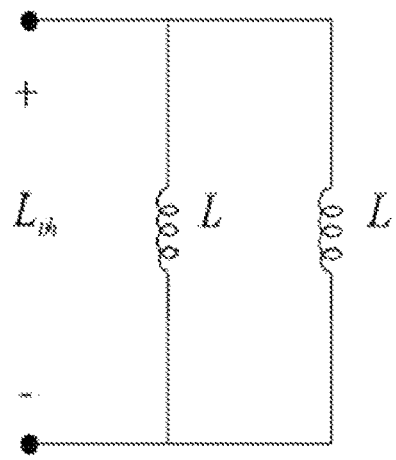
Figure 12C:
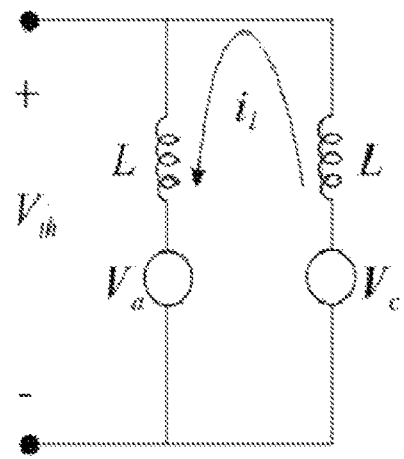
Figure 12C:
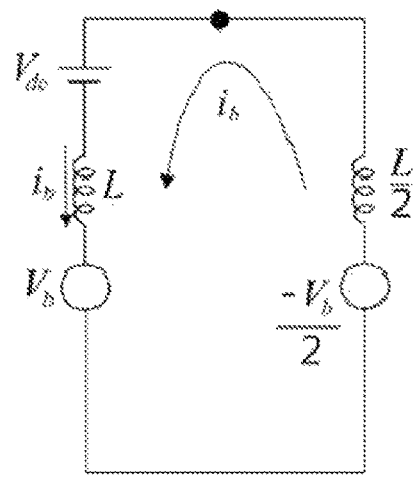

FIG. 12C illustrates a Thevenin equivalent circuit with respect to the b-phase current in accordance with the effective vector V6 (101).

FIG. 12C(a) illustrates a circuit for the motor 230 when the switching elements in the inverter 420 perform the switching operation in accordance with the effective vector V6 (101).

FIG. 12C(b) illustrates Thevenin equivalent impedance Lth for the motor 230, and FIG. 12C(c) illustrates Thevenin equivalent voltage Vth for the motor 230.

The Thevenin equivalent impedance Lth and the Thevenin equivalent voltage Vth are summarized by Equations 8 and 9 below.

$$L_{th} = \frac{L*L}{L+L} = \frac{L}{2} \qquad \text{Equation 8}$$

Herein, L denotes motor inductance.

$$2L\frac{di_1}{dt} + V_a - V_c = 0, \qquad \text{Equation 9}$$

$$L\frac{di_1}{dt} = \frac{V_c - V_a}{2}$$

$$V_{th} = V_a + L\frac{di_1}{dt}$$

$$V_{th} = V_a + \frac{V_c - V_a}{2} = \frac{V_c + V_a}{2} = -\frac{V_b}{2}$$

Herein, Va denotes an a-phase voltage, Vb denotes a b-phase voltage, and Vc denotes a c-phase voltage.

FIG. 12C(d) shows an equivalent circuit for FIG. 12C(a) based on Thevenin's principle of equivalency.

According to the equivalent circuit, Equation 10 below may be established for a voltage.

$$\frac{3}{2}L\frac{di_b}{dt} + \frac{3}{2}V_b + V_{dc} = 0, \qquad \text{Equation 10}$$

$$\frac{di_b}{dt} = \frac{-3V_b - 2V_{dc}}{3L}$$

Herein, $i_b$ denotes a b-phase current, $V_{dc}$ denotes a DC link voltage, and $$\frac{di_b}{dt}$$

denotes the gradient of the b-phase current.

Figure 12D:
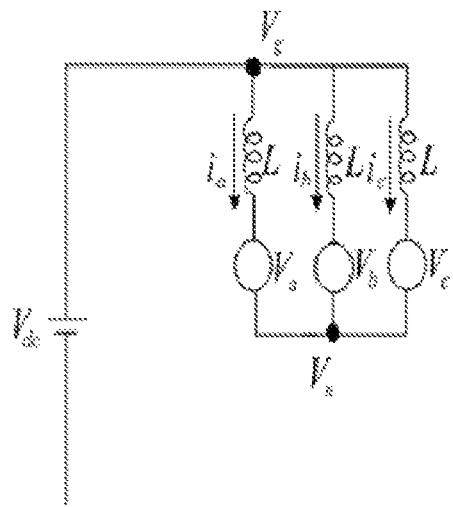
Figure 12D:
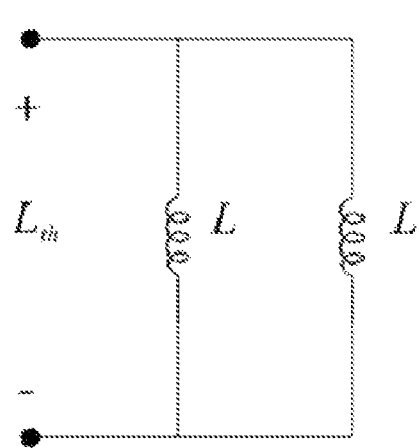
Figure 12D:
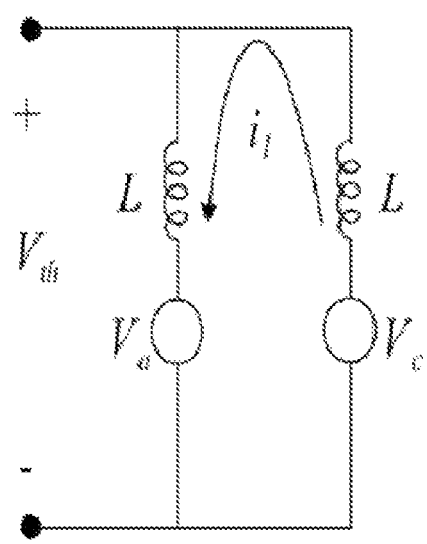
Figure 12D:
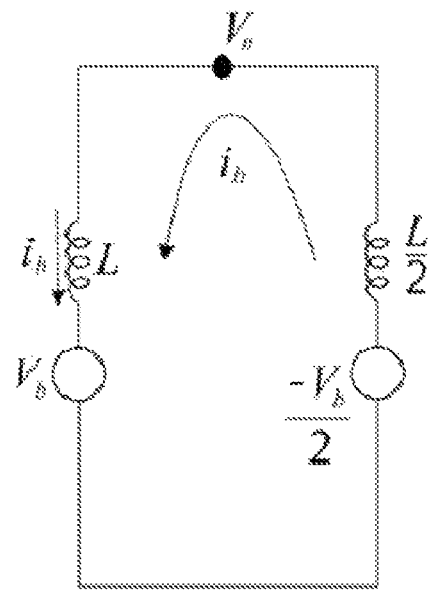

FIG. 12D illustrates a Thevenin equivalent circuit with respect to a b-phase current in accordance with the zero vector V7 (111).

FIG. 12D(a) illustrates a circuit for the motor 230 when the switching elements in the inverter 420 perform the switching operation in accordance with the zero vector V7 (111).

FIG. 12D(b) illustrates Thevenin equivalent impedance Lth for the motor 230, and FIG. 12D(c) illustrates Thevenin equivalent voltage Vth for the motor 230.

The Thevenin equivalent impedance Lth and the Thevenin equivalent voltage Vth are summarized by Equations 11 and 12 below.

$$L_{th} = \frac{L*L}{L+L} = \frac{L}{2} \qquad \text{Equation 11}$$

Herein, L denotes motor inductance.

$$2L\frac{di_1}{dt} + V_a - V_c = 0, \qquad \text{Equation 12}$$

$$L\frac{di_1}{dt} = \frac{V_c - V_a}{2}$$

$$V_{th} = V_a + L\frac{di_1}{dt}$$

-continued $$V_{th} = V_a + \frac{V_c - V_a}{2} = \frac{V_c + V_a}{2} = -\frac{V_b}{2}$$

Herein, Va denotes an a-phase voltage, Vb denotes a b-phase voltage, and Vc denotes a c-phase voltage.

FIG. 12C(d) shows an equivalent circuit for FIG. 12D(a) based on Thevenin's principle of equivalency.

According to the equivalent circuit, Equation 13 below may be established.

$$\frac{3}{2}L\frac{di_b}{dt} + \frac{3}{2}V_b = 0,$$

$$\frac{di_b}{dt} = \frac{-V_b}{L}$$

Equation 13

Herein, $i_b$ denotes a b-phase current, and $$\frac{di_b}{dt}$$

denotes the gradient of the b-phase current.

Phase currents estimated for the respective switching patterns using the aforementioned method are shown in FIG. 13.

FIG. 13 illustrates phase currents according to respective switching patterns.

Particularly, FIG. 13 shows a-phase current gradient $$\frac{di_a}{dt},$$

b-phase current gradient $$\frac{di_b}{dt}$$

and c-phase current gradient $$\frac{di_c}{dt}$$

according to the switching patterns of the effective vectors V1 to V6 and zero vectors V0 and V7.

Figure 14A:
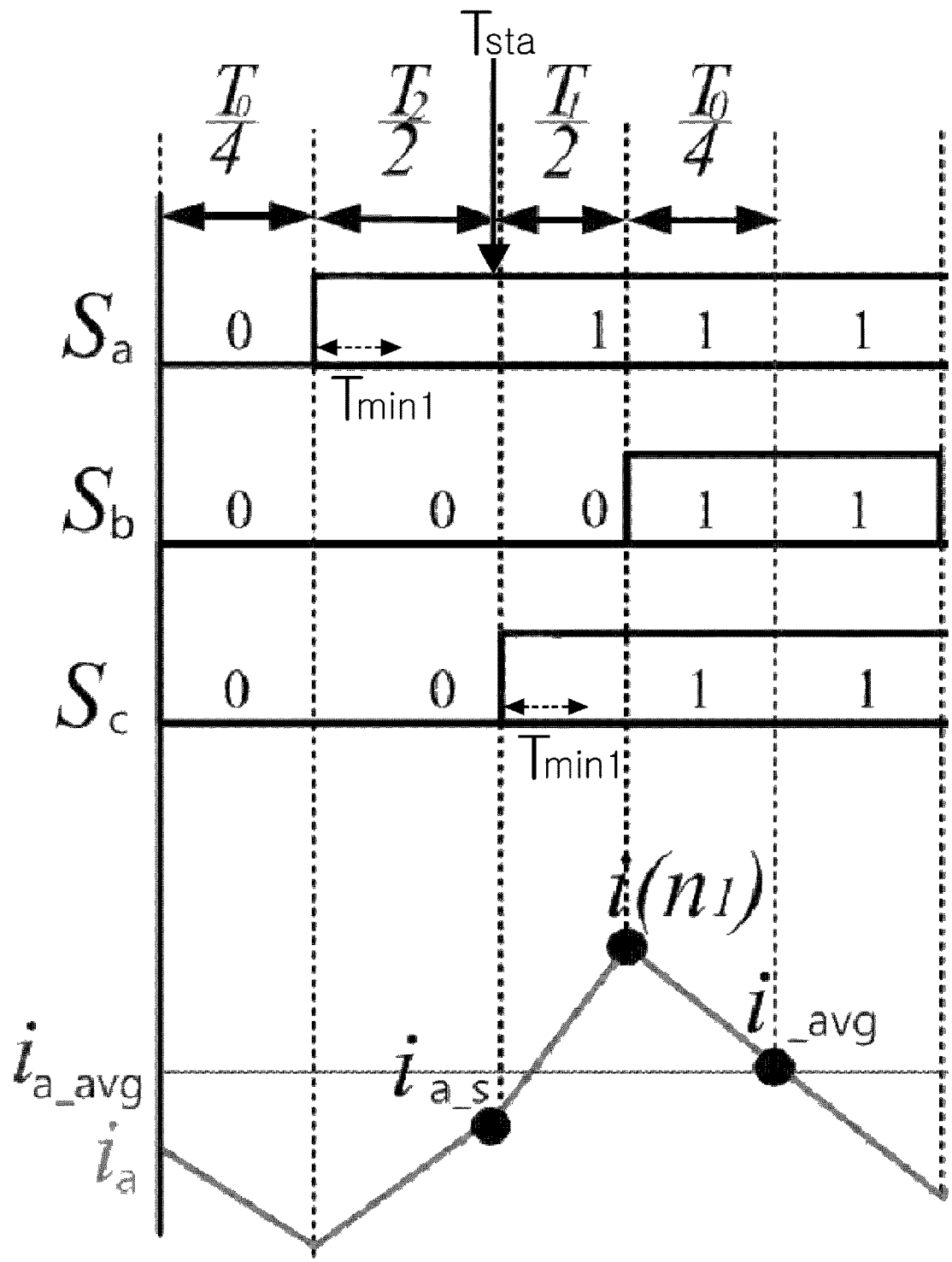
FIG. 14A illustrates calculation of a gradient of an a-phase current according to a predetermined voltage vector.

FIG. 14A illustrates calculation of a gradient of an a-phase current according to a predetermined voltage vector.

As shown in FIG. 14A, when two effective vector voltage application times are lower than $T_{min}$, a phase current restored by sampling an effective voltage vector does not coincide with an average current value for a PWM control period.

If the motor 230 is controlled using the phase current restored in this way, performance may be degraded.

Accordingly, the present invention proposes an algorithm for estimating an average current value for a PWM control period based on a current sampled through the DC link resistor Rdc.

For example, as described above, the inverter controller 430 may estimate a phase current, based on a phase current sampled through the DC link resistor, in an interval in which phase current detection is not possible within the PWM control period. The inverter controller 430 may also estimate a phase current during the whole PWM control period based on a phase current sampled through the DC link resistor. Thereby, the phase current may be stably estimated despite different voltage vector application times.

The inverter controller 430 estimates an average phase current based on the phase current sampled through the DC link resistor Rdc, using the phase current gradients $$\left(\frac{di_a}{dt}, \frac{di_b}{dt}, \frac{di_c}{dt}\right)$$

according to the respective switching patterns of FIG. 13 and the voltage vector application times (T0, T1).

Equations 14 and 15 represent calculation of an average a-phase current for FIG. 14A.

$$i_a(n_1) = \frac{-3E_a + V_{dc}}{3L} \times \frac{T_1}{2} + i_{a\_s}$$

Equation 14

$$i_{a\_avg} = -\frac{E_a}{L} \times \frac{T_0}{4} + i_a(n_1) =$$

$$-\frac{E_a}{L} \times \frac{T_0}{4} + \frac{-3E_a + V_{dc}}{3L} \times \frac{T_1}{2} + i_{a\_s} =$$

$$\frac{T_s}{L}\left[\frac{1}{6}(V_{cs} - V_{bs}) - \frac{E_a}{4}\left(1 + \frac{3V_{cs}}{V_{dc}}\right)\right] + i_{a\_s}$$

Herein, $i_a$ denotes an instantaneous a-phase current, $i_{a\_avg}$ denotes an average a-phase current, and $i_{a\_s}$ denotes a sampled a-phase current.

$$T_0 = T_s\left[1 - \frac{1}{V_{dc}}(V_{as} - V_{bs})\right]$$

Equation 15

$$T_1 = \frac{T_s}{V_{dc}}(V_{as} - V_{cs})$$

Herein, T0 and T1 denote voltage vector application times, $E_a$ denotes a-phase back electromotive force, $V_{dc}$ denotes a DC link voltage, L denotes inductance of the motor, $V_{as}$ denotes an a-phase voltage command value, and $V_{bs}$ denotes a b-phase voltage command value.

Figure 14B:
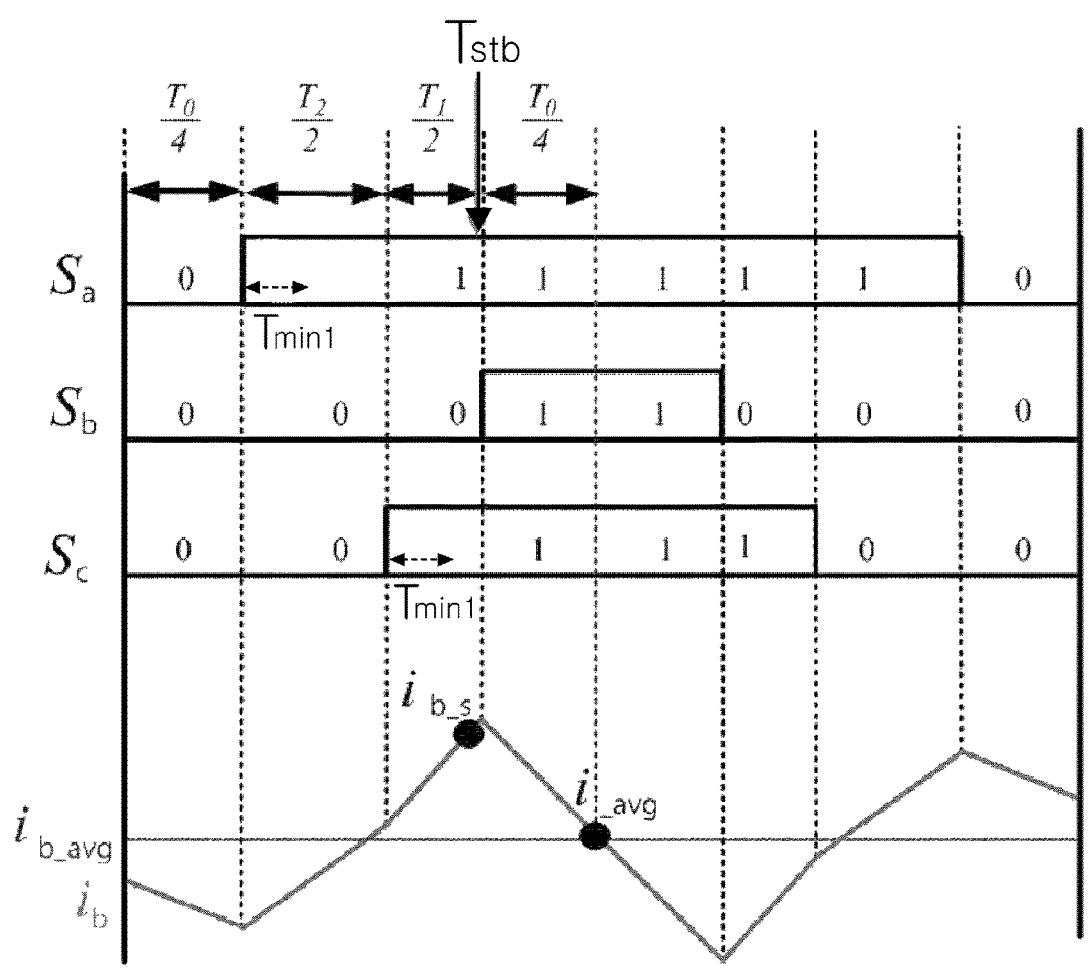
FIG. 14B illustrates calculation of a gradient of a b-phase current according to a predetermined voltage vector.

FIG. 14B illustrates calculation of a gradient of a b-phase current according to a predetermined voltage vector.

Equations 16 and 17 represent calculation of the average b-phase current of FIG. 14B.

$$i_{b\_avg} =$$

Equation 16

$$\frac{-E_b}{L} \times \frac{T_0}{4} + i_{b\_s} = -\frac{E_b T_s}{4L}\left[1 - \frac{1}{V_{dc}}(V_{as} - V_{bs})\right] + i_{b\_s}$$

Herein, $i_{b\_avg}$ denotes an average b-phase current, and $i_{b\_s}$ denotes a sampled b-phase current.

$$T_0 = T_s\left[1 - \frac{1}{V_{dc}}(V_{as} - V_{bs})\right]$$

Equation 17

Herein, $T_0$ denotes a voltage vector application time, Ts denotes a time corresponding to one period, $E_b$ denotes b-phase back electromotive force, $V_{dc}$ denotes a DC link voltage, $V_{as}$ denotes an a-phase voltage command value, and $V_{bs}$ denotes a b-phase voltage command value.

When Equations 14 to 17 are put together to summarize the algorithm for estimating an average current according to a switching pattern, Equation 18 below may be obtained.

$$i_{1st_{avg}} = \frac{T_s}{L}\left[\frac{1}{6}(V_{2nd} - V_{3rd}) - \frac{E_{1st}}{4}\left(1 + \frac{3V_{2nd}}{V_{dc}}\right)\right] + i_{1st_{sampling}} \quad \text{Equation 18}$$

$$i_{3rd_{avg}} = \frac{-E_{3rd} \times T_s}{4L}\left[1 - \frac{1}{V_{dc}}(V_{1st} - V_{3rd})\right] + i_{3rd_{sampling}}$$

Herein, the subscript "avg" denotes an estimated average current, the subscript "sampling" denotes a current at a time when sampling is performed through the DC link resistor Rdc, and the subscripts "1st," "2nd" and "3rd" represent an order of duty ratios within one PWM period from the highest to the lowest.

FIG. 14C illustrates an order of duty ratios in each sector.

In sectors 1 and 6, the a-phase has the highest duty ratio. In sectors 2 and 3, the b-phase has the highest duty ratio. In sectors 4 and 5, the c-phase has the highest duty ratio.

FIG. 15 illustrates a sensed current and an estimated current according to an embodiment of the present invention.

FIG. 15(a) shows a sensed current iaa in a dead band obtained without applying the current estimation algorithm, and FIG. 15(b) shows an estimated current iab in the dead band obtained by applying the current estimation algorithm.

The waveform of the sensed current iaa of FIG. 15(a) obtained without applying the current estimation algorithm has an accuracy of 93.5% with respect to the actual current.

Particularly, FIG. 15(b) shows the waveform of an average current estimated from an effective voltage using the gradient of a current at the sampling time and the application time of the effective voltage vector. The waveform has an accuracy of 99.5% with respect to the actual current.

According to the average current estimation technique of the present invention, a current estimated in the dead band is almost identical to the actual current.

The motor driving apparatus 220 may be employed by various apparatuses. For example, the motor driving apparatus 220 may be employed by home appliances such as a laundry treating appliance, an air conditioner, a refrigerator, a water purifier, and a cleaner. The motor driving apparatus 220 may also be applicable to, for example, a vehicle, a robot and a drone which can be driven by a motor.

Figure 16:
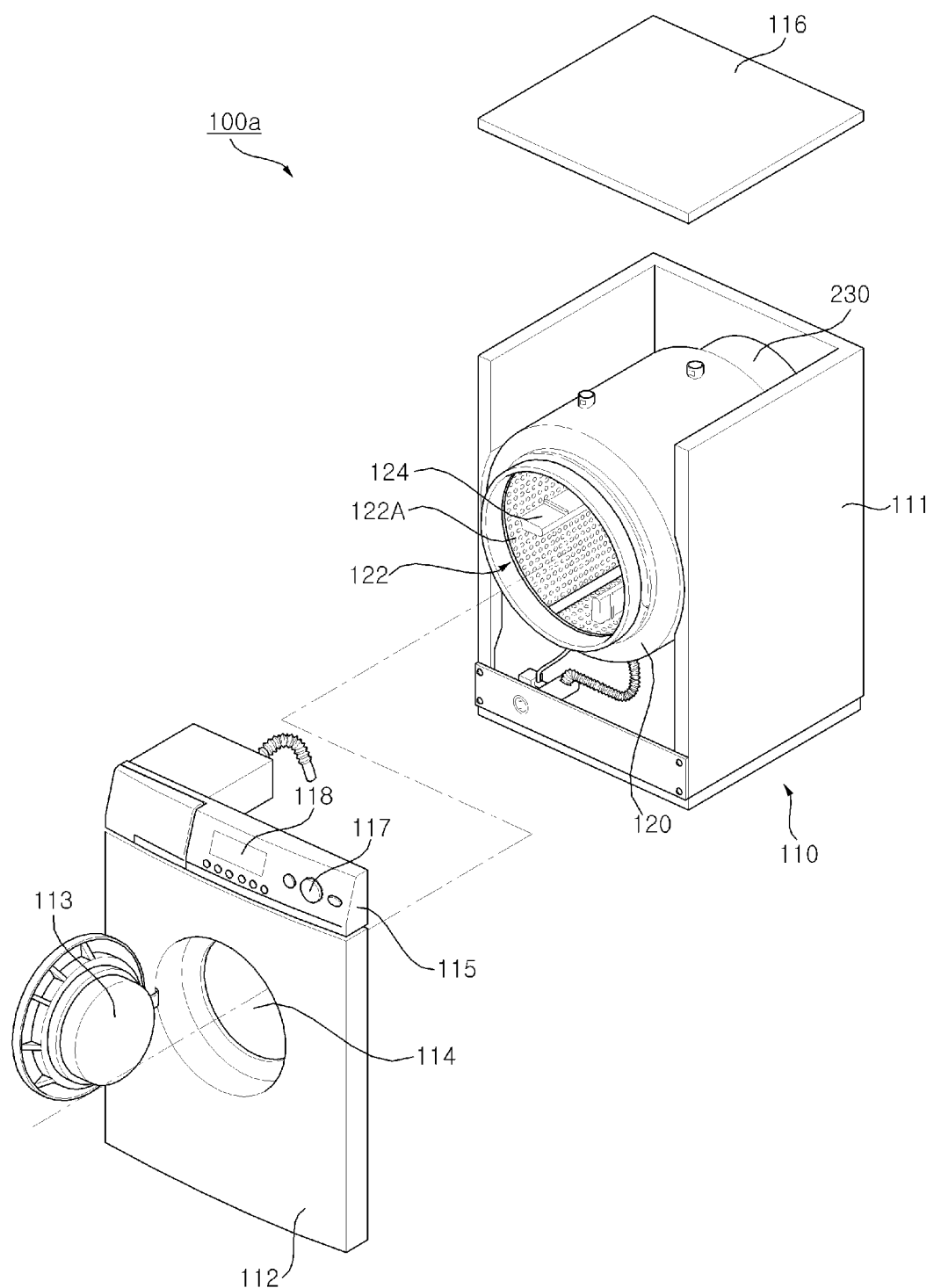
FIG. 16 is a perspective view illustrating a laundry treating appliance which is an exemplary home appliance according to an embodiment of the present invention.

FIG. 16 is a perspective view illustrating a laundry treating appliance according to an embodiment of the present invention.

Referring to FIG. 16, a laundry treating appliance 100a is a front-loading laundry treating appliance wherein laundry is inserted from the front into a washtub. The front-loading laundry treating appliance conceptually includes a washing machine for performing the operations of washing, rinsing and drying of inserted laundry or a dryer for drying inserted wet laundry. Hereinafter, description will be given focusing on the washing machine.

The laundry treating appliance 100a of FIG. 16, which is a washtub-based laundry treating appliance, includes a cabinet 110 defining the exterior of the laundry treating appliance 100a, a tub 120 disposed inside the cabinet 110 and supported by the cabinet 110, a washtub 122 which is disposed inside the tub 120 and in which laundry is washed, a motor 130 for driving the washtub 122, and a wash water supplier (not shown) disposed outside a cabinet body 111 to supply wash water into the cabinet 110, and a drainage unit (not shown) formed on the lower side of the tub 120 to discharge wash water outward.

The washtub 122 is provided with a plurality of through holes 122A allowing wash water to pass therethrough. A lifter 124 may be disposed on the inner surface of the washtub 122 to lift the laundry to a certain height during rotation such that the laundry drops due to gravity.

The cabinet 110 includes the cabinet body 111, a cabinet cover 112 disposed on and connected to the front surface of the cabinet body 111, a control panel 115 disposed on the upper side of the cabinet cover 112 and connected to the cabinet body 111, and a top plate 116 disposed on the upper side of the control panel 115 and connected to the cabinet body 111.

The cabinet cover 112 includes a laundry introduction hole 114 formed to allow introduction and retrieval of laundry therethrough and a door 113 disposed to be horizontally rotatable to open and close the laundry introduction hole 114.

The control panel 115 includes manipulation keys 117 for controlling the operation status of the laundry treating appliance 100a and a display unit 118 disposed on one side of the manipulation keys 117 to display the operation status of the laundry treating appliance 100a.

The manipulation keys 117 and the display unit 118 in the control panel 115 are electrically connected to a controller (not shown). The controller (not shown) electrically controls respective constituents of the laundry treating appliance 100a. Operation of the controller (not shown) will be described later.

The washtub 122 may be provided with an auto-balancer (not shown). The auto-balancer (not shown), which serves to attenuate vibration caused by eccentric quantity of laundry contained in the washtub 122, may be implemented by, for example, a liquid balancer or a ball balancer.

Although not shown in FIG. 16, the laundry treating appliance 100a may further include a vibration sensor for measuring the degree of vibration of the washtub 122 or the cabinet 110.

Figure 17:
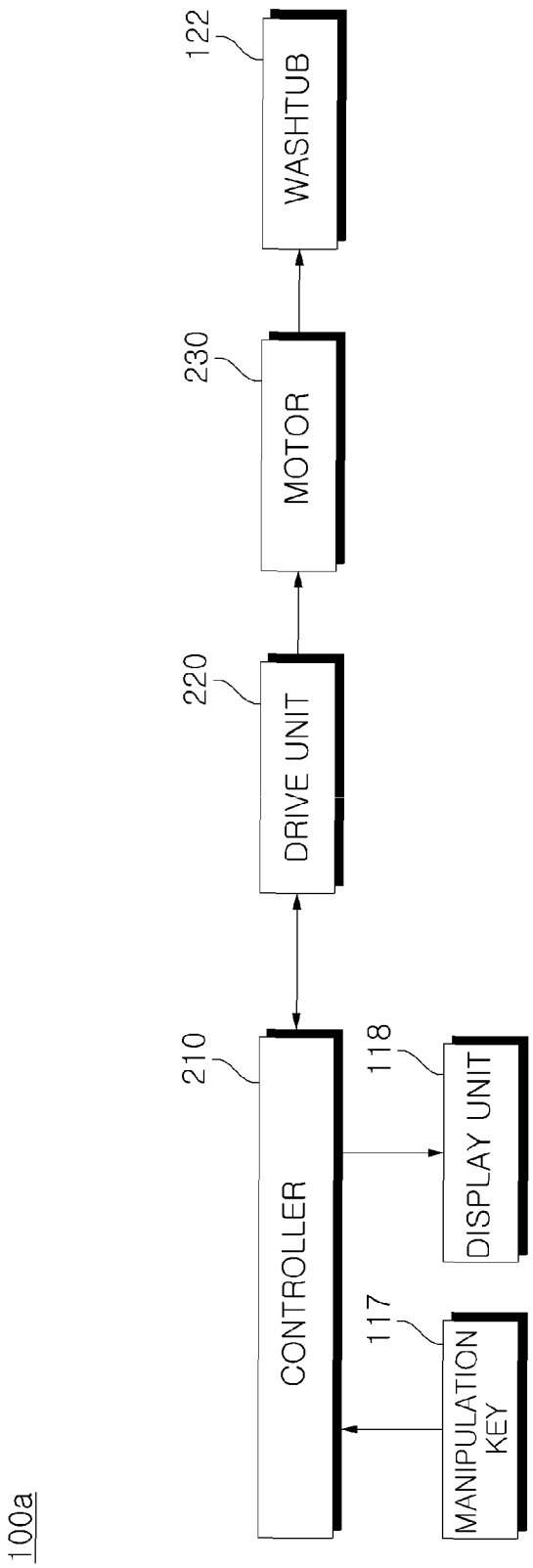
FIG. 17 is an internal block diagram of the laundry treating appliance of FIG. 16.

FIG. 17 is an internal block diagram of the laundry treating appliance of FIG. 16.

Referring to FIG. 17, in the laundry treating appliance 100a, the drive unit 220 is controlled by a controller 210. The drive unit 220 drives the motor 230. Thereby, the washtub 122 is rotated by the motor 230.

The controller 210 operates according to an operation signal received from the manipulation key 117. Thereby, washing, rinsing and drying may be performed.

In addition, the controller 210 may control the display 118 to display a washing mode, a washing time, a drying time, a rinsing time, or the current operation status.

The controller 210 controls the drive unit 220 to operate the motor 230. In this case, a position sensor for sensing the position of the rotor of the motor 230 is not provided to the interior or exterior of the motor 230. That is, the drive unit 220 controls the motor 230 in a sensorless manner.

The drive unit 220, which serves to drive the motor 230, may include an inverter (not shown), an inverter controller (not shown), an output current detector E (see FIG. 2) for detecting an output current flowing through the motor 230, and an output voltage detector F (see FIG. 2) for detecting an output voltage vo applied to the motor 230. The drive unit 220 may conceptually further include a converter for supplying DC voltage to be input to the inverter (not shown).

For example, the inverter controller 430 (see FIG. 2) estimates the position of the rotor of the motor 230 based on an output current io and the output voltage vo. Then, the drive unit 220 controls the motor 230 based on the estimated position of the rotor such that the motor 230 rotates.

Specifically, when the inverter controller 430 (see FIG. 2) generates a PWM switching control signal (Sic of FIG. 2) based on the output current io and the output voltage vo and outputs the same to the inverter (not shown), the inverter (not shown) supplies AC voltage of a predetermined frequency to the motor 230. Then, the motor 230 is caused to rotate by the AC voltage of the predetermined frequency.

The drive unit 220 may correspond to the motor driving apparatus 220 of FIG. 1.

The controller 210 may sense the amount of laundry based on, for example, the output current io flowing through the motor 230. For example, while the washtub 122 is rotating, the controller 210 may sense the amount of laundry based on the current value io of the motor 230.

Particularly, the controller 210 may accurately sense the amount of laundry using the rotor resistance and inductance of the motor measured in a motor alignment interval.

The controller 210 may sense eccentric quantity of the washtub 122, i.e., unbalance (UB) of the washtub 122. Sensing eccentric quantity may be performed based on a ripple component of the output current io flowing through the motor 230 or the amount of change in the rate of rotation of the washtub 122.

Particularly, the controller 210 may accurately sense the amount of laundry using the rotor resistance and inductance of the motor measured in a motor alignment interval.

Figure 18:
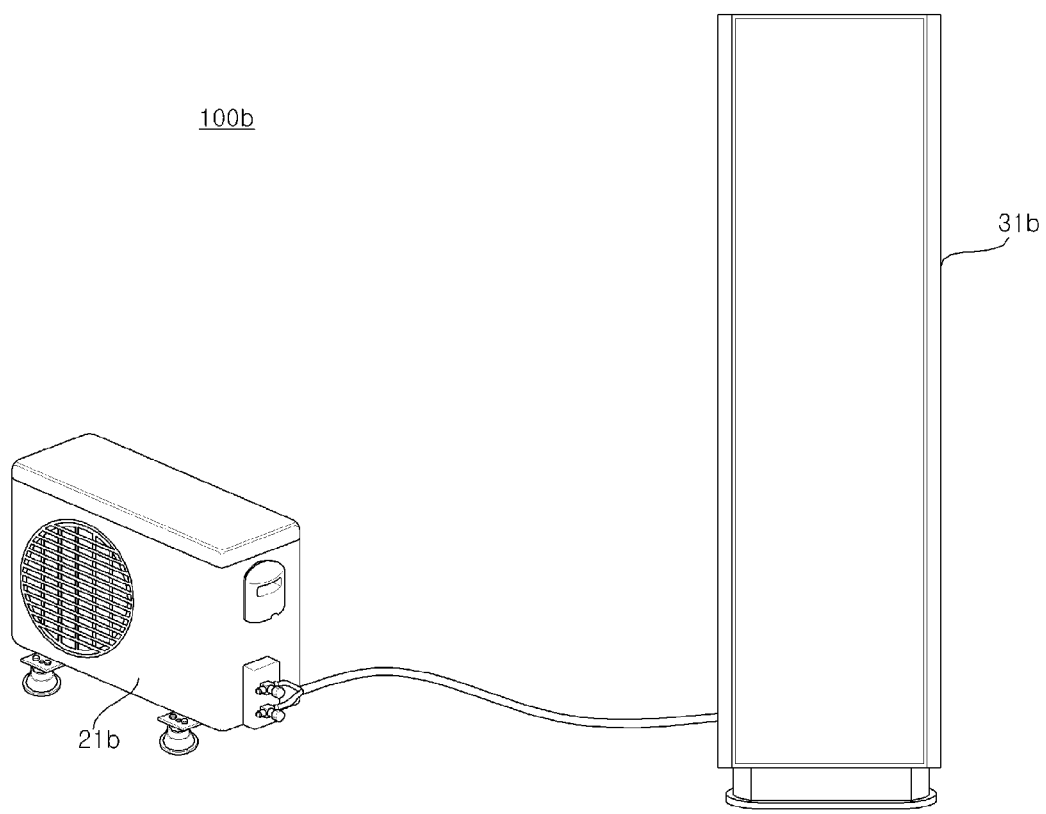
FIG. 18 is a view illustrating configuration of an air conditioner which is another exemplary home appliance according to an embodiment of the present invention.

FIG. 18 is a view illustrating configuration of an air conditioner which is another exemplary home appliance according to an embodiment of the present invention According to an embodiment, the air conditioner 100b may include an indoor unit 31b and an outdoor unit 21b connected to the indoor unit 31b, as shown in FIG. 18.

As the indoor unit 31b, any one of a standing indoor unit, a wall-mounted indoor unit and a ceiling-mounted indoor unit may be employed. In FIG. 18, the indoor unit 31b is a standing indoor unit.

The air conditioner 100b may further include at least one of a ventilator, an air cleaner, a humidifier and a heater, which may operate in connection with operations of the indoor unit and the outdoor unit.

The outdoor unit 21b includes a compressor (not shown) for compressing a refrigerant supplied thereto, an outdoor heat exchanger (not shown) causing heat exchange between the refrigerant and the outdoor air, an accumulator (not shown) for extracting a gaseous refrigerant from the supplied refrigerant and supplying the same to the compressor, and a 4-way valve (not shown) for selecting a flow path of the refrigerant according to the heating operation. The outdoor unit 21b further includes a plurality of sensors, a valve and an oil collector, which will not be described below.

The outdoor unit 21b operates the compressor and the outdoor heat exchanger provided to the outdoor unit 21b to compress the refrigerant or cause heat exchange according to the settings to supply the refrigerant to the indoor unit 31b. The outdoor unit 21b may be driven by a remote controller (not shown) or according to a request from the indoor unit 31b. As the cooling/heating capacity depends on the indoor unit, the number of operations of the outdoor unit and the number of operations of the compressor installed in the outdoor unit are changeable.

The outdoor unit 21b supplies the compressed refrigerant to the indoor unit 31b connected thereto.

The indoor unit 31b receives the refrigerant from the outdoor unit 21b and discharges cooled air to the indoor space. The indoor unit 31b includes an indoor heat exchanger (not shown), an indoor unit fan (not shown), an expansion valve (not shown) for expanding the supplied refrigerant, and multiple sensors (not shown).

The outdoor unit 21b and the indoor unit 31b are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to the indoor unit 31b to input a control command of the user to the indoor unit. The remote control may receive and display the status information about the indoor unit. The remote control may communicate with the indoor unit by wire or wirelessly.

Figure 19:
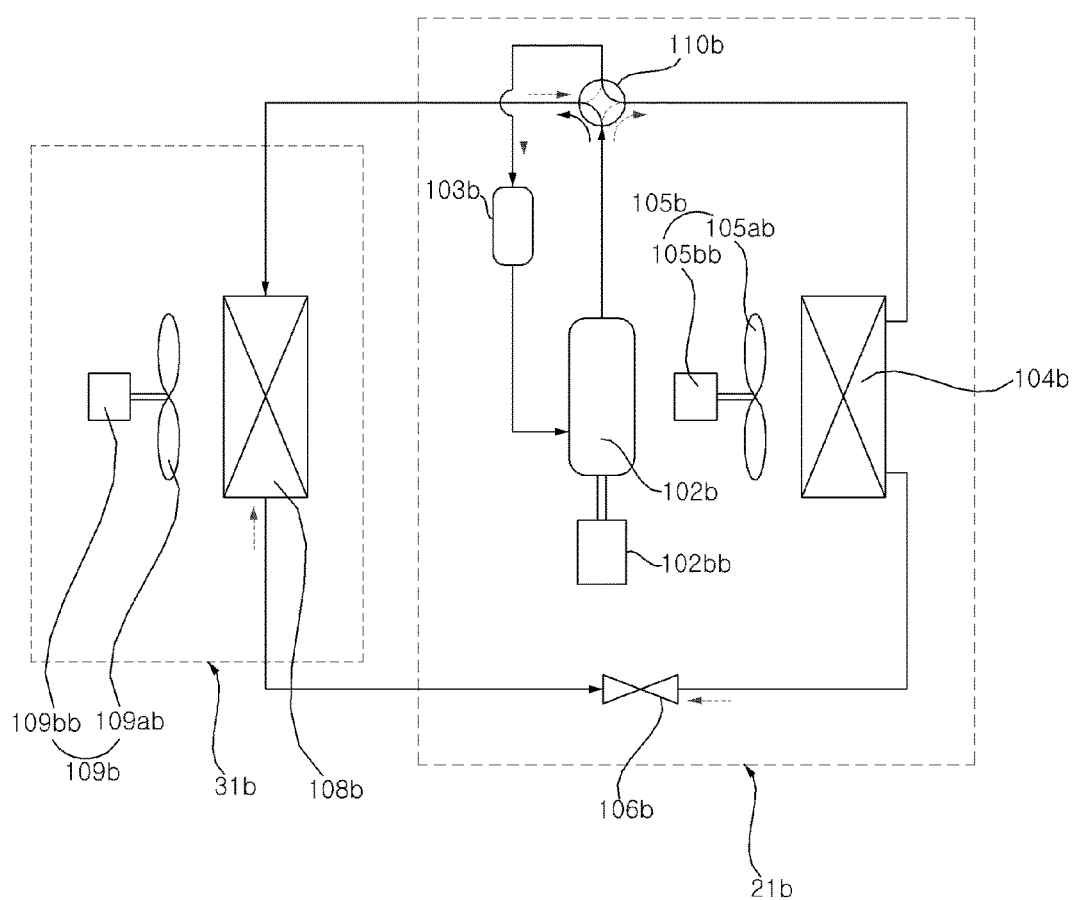
FIG. 19 is a schematic diagram illustrating the outdoor unit and the indoor unit of FIG. 18.

FIG. 19 is a schematic diagram illustrating the outdoor unit and the indoor unit of FIG. 18.

Referring to FIG. 19, the air conditioner 100b is broadly divided into the indoor unit 31b and the outdoor unit 21b.

The outdoor unit 21b includes a compressor 102b serving to compress the refrigerant, a compressor motor 102bb for driving the compressor, an outdoor heat exchanger 104b serving to dissipate heat from the compressed refrigerant, an outdoor air blower 105b including an outdoor fan 105ab disposed on one side of the outdoor heat exchanger 104b to support heat dissipation from the refrigerant and a motor 105bb for rotating the outdoor fan 105ab, an expansion mechanism 106b for expanding the condensed refrigerant, a cooling/heating switching valve 110b for switching between flow paths of the compressed refrigerant, and an accumulator 103b for temporarily storing the evaporated refrigerant, removing moisture and foreign substances from the stored refrigerant, and then supplying the refrigerant of a constant pressure to the accumulator 103b.

The indoor unit 31b includes an indoor heat exchanger 109b disposed in the indoor space to perform the cooling/heating functions and an indoor air blower 109b including an indoor fan 109ab disposed on one side of the indoor heat exchanger 109b to support heat dissipation from the refrigerant and a motor 109bb for rotating the indoor fan 109ab.

At least one indoor heat exchanger 109b may be installed. As the compressor 102b, at least one of an inverter compressor and a constant speed compressor may be employed.

The air conditioner 100b may be configured as an air cooler for cooling the indoor space or as a heat pump for cooling or heating the indoor space.

The compressor 102b in the outdoor unit 21b of FIG. 18 may be driven by a motor driving apparatus for driving a compressor motor 250b such as the motor driving apparatus of FIG. 1.

Alternatively, the indoor fan 109ab or the outdoor fan 105ab may be driven by a motor driving apparatus for driving an indoor fan motor 109bb or an outdoor fan motor 150bb, such as the motor driving apparatus of FIG. 1.

Figure 20:
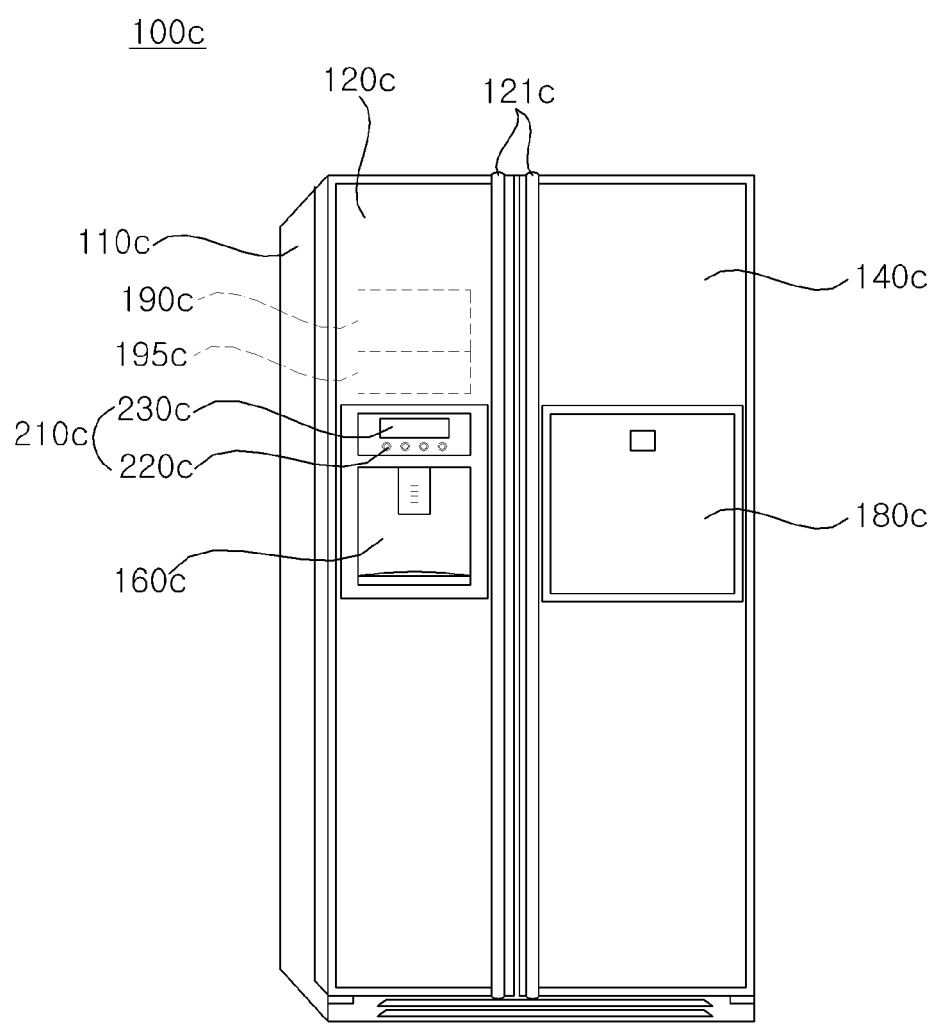
FIG. 20 is a perspective view illustrating a refrigerator which is another exemplary home appliance according to an embodiment of the present invention.

FIG. 20 is a perspective view illustrating a refrigerator which is another exemplary home appliance according to an embodiment of the present invention Referring to FIG. 20, the overall exterior of a refrigerator 100c related to the present invention is defined by a case 110c having an inner space partitioned into a freezer compartment and a cooling compartment, which are not shown, a freezer compartment door 120c for shielding the freezer compartment, and a cooling compartment door 140c for shielding the cooling compartment.

The front surfaces of the freezer compartment door 120c and the cooling compartment door 140c are provided with door handles 121c protruding forwards such that the user can easily grip the door handles 121c to rotate the freezer compartment door 120c and the cooling compartment door 140c.

The front surface of the cooling compartment door 140c may be further provided with a home bar 180c, which is a convenience means allowing the user to take out a stored item such as a beverage without opening the cooling compartment door 140c.

The front surface of the freezer compartment door 120c may be further provided with a dispenser 160c, which is a convenience means allowing the user to take out ice or drink water without opening the freezer compartment door 120c. A control panel 210c for controlling operation of the refrigerator 100c and displaying the operation status of the refrigerator 100c may be provided on the upper side of the dispenser 160c.

While the dispenser 160c is illustrated as being disposed on the front surface of the freezer compartment door 120c, embodiments of the present invention are not limited thereto. The dispenser 160c may be disposed on the front surface of the cooling compartment door 140c.

Meanwhile, the inner upper portion of the freezer compartment (not shown) may be provided with an icemaker 190c for making ice out of the supplied water using cold air in the freezer compartment and an ice bank 195c installed inside the freezer compartment (not shown) to contain separated ice pieces made by the icemaker. Although not shown in the figure, an ice chute (not shown) for guiding fall of ice from the ice bank 195c into the dispenser 160c may be further provided.

The control panel 210c may include an input unit 220c comprising multiple buttons and a display unit 230c for displaying a control window and an operation status.

The display unit 230c displays a control window, an operation status and information such as a temperature in the refrigerator. For example, the display unit 230c may display a service mode (ice cubes, water, chipped ice) of the dispenser, a set temperature of the freezer compartment, and a set temperature of the cooling compartment.

The display unit 230c may be implemented by employing, for example, a liquid crystal display (LCD), light emitting diodes (LEDs), and organic light emitting diodes (OLEDs). The display unit 230c may also be implemented by employing a touchscreen capable of performing the function of the input unit 220c.

The input unit 220c may be provided with multiple manipulation buttons. For example, the input unit 220c may include a dispenser setting button (not shown) for setting a service mode (ice cubes, water, chipped ice, etc.) of the dispenser, a freezer compartment temperature setting button (not shown) for setting the temperature of the freezer compartment, a cooling compartment temperature setting button (not shown) for setting the temperature of the cooling compartment. The input unit 220c may be implemented by a touchscreen capable of performing the function of the display unit 230c.

The refrigerator according to embodiments of the present invention is not limited to the illustrated double door type refrigerator. The refrigerator may be of any type of refrigerator including one door type, sliding door type, and curtain door type.

Figure 21:
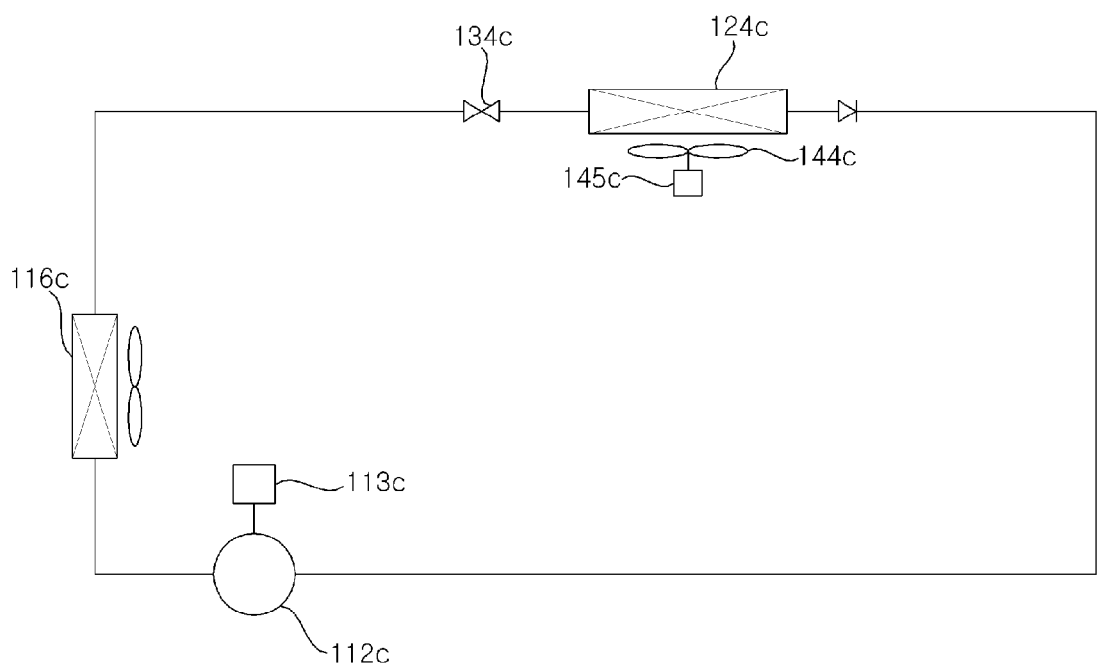
FIG. 21 is a diagram schematically illustrating configuration of the refrigerator of FIG. 20.

FIG. 21 is a diagram schematically illustrating configuration of the refrigerator of FIG. 20.

Referring to FIG. 21, the refrigerator 100c may include a compressor 112c, a condenser 116c for condensing a refrigerant compressed by the compressor 112c, a freezer compartment evaporator 124c disposed on the freezer compartment (not shown) to evaporate the condensed refrigerant supplied from the condenser 116c, and a freezer compartment expansion valve 134c for expanding the refrigerant supplied from the freezer compartment evaporator 124c.

While FIG. 21 illustrates that one evaporator is used, each of the cooling compartment and the freezer compartment may employ an evaporator.

That is, the refrigerator 100c may further include a cooling compartment evaporator (not shown) disposed on the cooling compartment (not shown), a 3-way valve (not shown) for supplying the refrigerant condensed by the condenser 116c to the cooling compartment evaporator (not shown) or the freezer compartment evaporator 124c, and a cooling compartment expansion valve (not shown) for expanding the refrigerant supplied to the cooling compartment evaporator (not shown).

The refrigerator 100c may further include a liquid-gas separator (not shown) in which the refrigerant from the evaporator 124c is separated into liquid and gas.

The refrigerator 100c may further include a cooling compartment fan (not shown) and a freezer compartment fan 144c, which suction cold air arriving via the freezer compartment evaporator 124c and supply the same to the cooling compartment (not shown) and the freezer compartment (not shown).

The refrigerator 100c may further include a compressor drive unit 113c for driving the compressor 112c, a cooling compartment drive unit (not shown) for driving the cooling compartment fan (not shown), and a freezer compartment fan drive unit 145c for driving the freezer compartment fan 144c.

Referring to FIG. 21, the evaporator 124c is used for both the cooling compartment and the freezer compartment. In this case, a damper (not shown) may be installed between the cooling compartment and the freezer compartment, and the fan (not shown) may forcibly blow the air cooled by the evaporator to the freezer compartment and the cooling compartment.

The compressor 112c of FIG. 21 may be driven by a motor driving apparatus for driving the compressor motor, such as the motor driving apparatus of FIG. 1.

Alternatively, the cooling compartment fan (not shown) or the freezer compartment fan 144c may be driven by a motor driving apparatus for driving the cooling compartment fan motor (not shown) or the freezer compartment fan motor (not shown), such as the motor driving apparatus of FIG. 1.

The motor driving apparatus and the home appliance having the same according to embodiments of the present invention are not limited to configurations and methods of the embodiments described above. Variations may be made to the embodiments described above by selectively combining all or some of the embodiments.

A motor driving method or a method for operating the home appliance according to the present invention is implementable by code which can be read, on a recording medium which can be read by a processor provided to the motor driving apparatus or home appliance, by the processor. The recording medium readable by the processor includes all kinds of recording devices for storing data which can be read by the processor.

As is apparent from the above description, the present invention has the following effects.

According to an embodiment of the present invention, a motor driving apparatus and a home appliance having the same include an inverter for converting direct current (DC) power of a DC link capacitor into alternating current (AC) power through a switching operation and outputting the converted AC voltage to a motor, a DC link resistor disposed between the DC link capacitor and the inverter, and a controller for controlling the motor based on a phase current sampled through the DC link resistor. The controller may accurately calculate the phase current flowing through the motor using the DC link resistor, by estimating the phase current in an interval in which phase current detection is impossible, based on the phase current sampled through the DC link resistor.

Particularly, a switching element in the inverter is controlled through space vector-based pulse width modulation control, and a phase current is estimated based on the phase current sampled through the DC resistor in the interval in which phase current detection is impossible within the pulse width modulation control period as the voltage vector application time is shorter than the minimum voltage application time. Thereby, it is not necessary to intentionally shift the switching timing of the inverter switching element. Therefore, noise may not occur and thus the phase current may be accurately calculated.

As the phase current is detected through time division using one DC link resistor, manufacturing costs may be reduced and apparatus installation may be facilitated.

The motor controller may perform current compensation on a 3-phase current whose detection time is different from the cancellation time thereof, with respect to a first time within the pulse width modulation control period, and control the inverter based on the current-compensated 3-phase current. Thereby, accuracy may be further enhanced in controlling the inverter.

According to another embodiment of the present invention, an inverter controller controls a switching element in an inverter through space vector-based pulse width modulation control, and estimates a phase current based on a phase current sampled through a DC link resistor, a phase current gradient according to the switching pattern of the switching element in the inverter and a voltage vector application time according to a voltage command value within the pulse width modulation control period. Thereby, the phase current may be stably estimated despite different voltage vector application times.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor driving apparatus comprising:
    an inverter to convert a DC voltage of a DC-link capacitor into an AC voltage; a DC-link resistor disposed between the DC-link capacitor and the inverter; and
    a controller to control the inverter based on a phase current sampled through the DC-link resistor, wherein the controller estimates a phase current based on the phase current sampled through the DC-link resistor, in an interval in which phase current detection is not possible, and
    wherein the AC voltage is converted in accordance with a switching operation output to a motor,
    wherein the controller controls a switching element in the inverter according to space vector-based pulse width modulation control, and estimates the phase current based on the sampled phase current in the interval in which a voltage vector application time is shorter A than a minimum voltage vector application time, and
    wherein the controller estimates the phase current in the interval based on back electromotive force of the motor, the sampled phase current, a phase current gradient according to a switching pattern of a switching element in the inverter, and a voltage vector application time according to a voltage command value.

2. The motor driving apparatus of claim 1, wherein estimating the phase current includes estimating an average phase current.

3. The motor driving apparatus of claim 1, wherein the controller controls a switching element in the inverter according to space vector-based pulse width modulation control, detects, at different times, two phase currents of a 3-phase current flowing through the motor and calculates the other phase current of the 3-phase current based on the two detected currents.

4. The motor driving apparatus of claim 3, wherein the controller performs current compensation for the 3-phase current with respect to a first time within the pulse width modulation control period, and controls the inverter based on a 3-phase current obtained through the current compensation, wherein the times for the detection are different from a time for the calculation.

5. The motor driving apparatus of claim 1, wherein the minimum voltage vector application time is a sum of a ring settling time, a dead time of the inverter, and an analog-to-digital (AD) conversion time.

6. The motor driving apparatus of claim 1, wherein the controller estimates the phase current based on the sampled phase current without a turn-on timing shift of the switching element in the interval in which the phase current detection is not possible.

7. The motor driving apparatus of claim 1, further comprising:
    a converter to convert an AC voltage into a DC voltage;
    the DC-link capacitor to store a DC-link voltage corresponding to an output terminal of the converter, and
    a DC-link voltage detector to detect the DC-link voltage.

8. The motor driving apparatus of claim 7, wherein the controller comprises:
    a speed calculator to calculate a speed of the motor based on a detected output current of the inverter;
    a current command generator to generate the current command value based on the calculated speed of the motor and a speed command value;
    a voltage command generator to generate a voltage command value based on the current command value and the detected output current; and
    a switching control signal output unit to output, based on the voltage command value, a switching control signal for driving the inverter.

9. The motor driving apparatus of claim 1, wherein the controller controls a switching element in the inverter according to space vector-based pulse width modulation control, and estimates the phase current during a pulse width modulation control period, based on the sampled phase current, a phase current gradient according to a switching pattern of a switching element in the inverter, and a voltage vector application time according to a voltage command value.

10. A home appliance comprising:
a motor;
an inverter to convert a DC voltage of a DC-link capacitor into an AC voltage;
a DC-link resistor disposed between the DC-link capacitor and the inverter; and
a controller to control the inverter based on a phase current sampled through the DC-link resistor,
wherein the controller estimates a phase current based on the phase current sampled through the DC link resistor, in an interval in which phase current detection is not possible,
wherein the AC voltage is converted in accordance with a switching operation and output to a motor,
wherein the controller controls a switching element in the inverter according to space vector-based pulse width modulation control, and estimates the phase current based on the sampled phase current in the interval in which a voltage vector application time is shorter than a minimum voltage vector application time, and
wherein the controller estimates the phase current in the interval based on back electromotive force of the motor, the sampled phase current, a phase current gradient according to a switching pattern of a switching element in the inverter, and a voltage vector application time according to a voltage command value.

11. The home appliance of claim 10, wherein the controller controls a switching element in the inverter according to space vector-based pulse width modulation control, detects, at different times, two phase currents of a 3-phase current flowing through the motor, and calculates the other phase current of the 3-phase current based on the two detected currents.

12. The home appliance of claim 11, wherein the controller performs current compensation for the 3-phase current with respect to a first time within the pulse width modulation control period, and controls the inverter based on a 3-phase current obtained through the current compensation, wherein the times for the detection are different from a time for the calculation.

13. The home appliance of claim 10, wherein the minimum voltage vector application time is a sum of a ring settling time, a dead time of the inverter, and an analog-to-digital (AD) conversion time.

14. The home appliance of claim 10, wherein the controller estimates the phase current based on the sampled phase current without a turn-on timing shift of the switching element in the interval in which the phase current detection is not possible.

15. The home appliance of claim 10, further comprising:
a converter to convert an AC voltage into a DC voltage;
the DC-link capacitor to store a DC-link voltage corresponding to an output terminal of the converter, and
a DC-link voltage detector to detect the DC-link voltage,
wherein the controller comprises:
a speed calculator to calculate a speed of the motor based on a detected output current of the inverter;
a current command generator to generate the current command value based on the calculated speed of the motor and a speed command value;
a voltage command generator to generate a voltage command value based on the current command value and the detected output current; and
a switching control signal output unit to output, based on the voltage command value, a switching control signal for driving the inverter.

* * * * *